United States Patent [19]
Drake et al.

[11] Patent Number: 6,128,122
[45] Date of Patent: Oct. 3, 2000

[54] MICROMACHINED MIRROR WITH STRETCHABLE RESTORING FORCE MEMBER

[75] Inventors: Joseph D. Drake; John H. Jerman, both of Palo Alto; John D. Grade, Mountain View, all of Calif.

[73] Assignee: Seagate Technology, Inc., Scotts Valley, Calif.

[21] Appl. No.: 09/398,259

[22] Filed: Sep. 17, 1999

Related U.S. Application Data

[63] Continuation-in-part of application No. 09/231,317, Jan. 13, 1999, Pat. No. 5,999,303, and a division of application No. 08/823,422, Mar. 24, 1997, abandoned.
[60] Provisional application No. 60/100,989, Sep. 18, 1998.
[51] Int. Cl.$^7$ .................................................. G02B 26/08
[52] U.S. Cl. ........................ 359/224; 359/198; 359/199; 359/223; 359/224; 369/112; 369/44.14
[58] Field of Search .................................. 359/198, 199, 359/212–214, 223, 224, 848, 871; 369/44.11, 44.14, 112

[56] References Cited

U.S. PATENT DOCUMENTS

| | | | |
|---|---|---|---|
| 5,116,457 | 5/1992 | Jerman | 156/628 |
| 5,153,870 | 10/1992 | Lee et al. | 369/111 |
| 5,202,875 | 4/1993 | Rosen et al. | 369/94 |
| 5,719,846 | 2/1998 | Matoba | 369/112 |
| 6,002,661 | 12/1999 | Abe et al. | 369/112 |

OTHER PUBLICATIONS

Burns et al., Nonlinear Flexures for Stable Deflection of an Electrostatically Actuated Micromirror, Proc. SPIE, vol. 3226, Austin, TX, Sep. 1997.

Jerman, The Fabrication and Use of Micromachined Corrugated Silicon Diaphragms, Sensors and Actuators, A21–A23 (1990) pp. 988–992 (No Month).

Judy, Mechanisms Using Sidewall Beams, U.C. Berkeley, 1994 (No Momth).

Seeger et al., Stabilization of Electrostatically Actuated Mechanical Devices, Proc. Transducers '97, Chicago, IL, pp. 1133–1136, Jun. 1997.

*Primary Examiner*—James Phan
*Attorney, Agent, or Firm*—Flehr Hohbach Test Albritton & Herbert LLP

[57] ABSTRACT

A mirror assembly of micron dimensions for use in deflecting beam of light. The mirror assembly includes a planar base and a planar mirror spaced apart from the planar base and disposed generally parallel to the planar base. The planar mirror has first and second end portions and a longitudinal axis extending between the first and second end portions. First and second torsional members extend along the longitudinal axis and are connected to the respective first and second end portions for permitting the mirror to rock between first and second positions about the longitudinal axis relative to the planar base. The first and second torsional members are secured to the planar base. At least a portion of the mirror is made from a conductive material. First and second spaced-apart electrodes are carried by the planar base for driving the mirror between the first and second positions. A tether member extends transversely of the longitudinal axis and is secured to the first torsional member and to the planar base. The tether member regulates the rocking of the mirror.

20 Claims, 12 Drawing Sheets

| Geometrical Parameter | | Symbol | Value | |
|---|---|---|---|---|
| | | | Design 1 | Design 2 |
| Hinge: | Length | $L_h$ | 50.0 | 50.0 |
| | Width | $W_h$ | 3.3 | 2.5 |
| | Depth | $T_h$ | 2.0 | 2.0 |
| Tether: | Length | $L_t$ | 77.0 | 60.0 |
| | Width | $W_t$ | 2.0 | 2.0 |
| | Depth | $T_t$ | 0.5 | 0.2 |
| Flange: | Length | $L_f$ | 25.0 | 75.0 |
| | Width | $W_f$ | 6.0 | 6.0 |
| | Depth | $T_f$ | 8.0 | 8.0 |
| Plate Attach: | Length | $L_p$ | 5.0 | 5.0 |
| | Width | $W_p$ | 3.3 | 3.5 |
| | Depth | $T_p$ | 8.0 | 8.0 |
| Linear Spring Constant | | $k_1$ | 0.0092 | 0.0083 |
| Cubic Spring Constant | | $k_3$ | 2.6928 | 20.0870 |
| Ratio of $k_3$ to $k_1$ | | r | 293.3 | 2415.8 |

# MICROMACHINED MIRROR WITH STRETCHABLE RESTORING FORCE MEMBER

CROSS REFERENCE TO RELATED APPLICATIONS

This application claims priority to U.S. provisional patent application Ser. No. 60/100,989 filed Sep. 18, 1998 and is a continuation-in-part of U.S. patent application Ser. No. 09/231,317 filed Jan. 13, 1999, U.S. Pat. No. 5,999,303, and is a divisional of U.S. patent application Ser. No. 08/823,422 filed Mar. 24, 1997, abandoned, the entire contents of all of which are incorporated herein by this reference.

BACKGROUND OF THE INVENTION

1. Field of the Invention

The present invention relates to micromachined mirrors for use in optical switching, steering and scanning systems and, more particularly, to micromachine mirrors for use in optical data tracking, storage and retrieval systems.

2. Background

Electrostatic pull-in is a phenomenon that limits the rang of electrostatically driven deflectable micromachined devices. In general, pull-in occurs when the nonlinear electrostatic drive overwhelms the capabilities of the device's mechanical suspension to achieve equilibrium with the electrostatic forces. In a torsional mirror, such as of the type described in copending U.S. patent application Ser. No. 09/231,317 filed Jan. 13, 1999, the electrostatic drive causes rotation of the mirror plate about the axis defined by the torsional hinge suspension. An equilibrium angular deflection is achieved when the restoring torque provided by the two torsional hinges balances the electrostatic attraction torque provided by the drive electrode. The torsional hinge suspension provides a restoring torque that is proportional to the angle of rotation of the mirror plate. However, the electrostatic torque increases nonlinearly as the separation between the drive electrode and the grounded mirror plate is decreased by the rotation of the mirror plate. At some value of angular deflection, the electrostatic torque becomes larger than what can be balanced by the linear restoring torque of the hinges. At this pull-in angle, the outer edge of the mirror plate spontaneously deflects across the remainder of the electrostatic gap thus limiting the useful angular range of the mirror to less than that which results in pull-in.

The issue of electrostatic pull-in has been presented and analyzed in several publications. For example, Seeger and Crary, *Stabilization of Electrostatically Actuated Mechanical Devices,* Proc. Transducers '97, Chicago, Ill., pp. 1133–1136, June 1997, present an approach towards preventing the pull-in phenomenon from occurring in translational electrostatic actuators. Their method places a feedback capacitor in series with the device which essentially modifies the potential energy function of the system to the point where no unstable operating points exist as the movable plate is driven towards the drive electrode. Although this method can be used to increase the stable range of torsional electrostatic devices, it has the undesirable tradeoff that the actuation voltage has to be dramatically increased in order to charge the feedback capacitor.

The issue of electrostatic pull-in for translational micromachined mirrors was discussed in Burns and Bright, *Nonlinear Flexures for Stable Deflection of an Electrostatically Actuated Micromirror,* Proc. SPIE, Vol. 3226, Austin, Tex., Sept. 1997. In this paper, a theoretical argument for the use of flexures with nonlinear deflection performance is presented. However, a design that provides for nonlinear performance is not presented. Rather, a design for a composite flexure comprising a primary and an auxiliary wherein beyond a certain deflection of the primary flexure the restoring force provided by the auxiliary flexure is combined additively to that of the primary flexure is disclosed. As such, the flexural design is piecewise linear rather than truly nonlinear.

The suspension means for both translational and torsional electrostatically actuated micromachined devices are typically modeled as slender beams or thin diaphragms. For small deflections and rotations, these structures behave linearly. Thus, the load acting on the structure is proportional to its deflection with the constant of proportionality equal to the spring constant specific to that direction of deformation. For large deflections or rotations, these structures no longer respond linearly to applied loads. The form of the nonlineality is highly dependent on the specifics of the suspension geometry but generally takes on a relationship that is approximately a superposition of the small deflection linear term together with a cubic term which dominates for the larger deflections and rotations. In Jerman, *The Fabrication and Use of Micromachined Corrugated Silicon Diaphragms,* Sensors and Actuators, A21–A23 (1990) pp. 988–992 and U.S. Pat. No. 5,116,457 for *Semiconductor Transducer or Actuator Utilizing Corrugated Supports* to Jerman, an example of such a relationship is given where thin diaphragms are used to support the central boss of a micromachined structure. However, in these references Jerman does not make productive use of the non-linear deflection characteristics of these diaphragms.

What is needed is an improved micromachined mirror assembly having a restoring torque that increases nonlinearly with the deflection angle of the mirror to compensate for the nonlinear electrostatic drive forces of the mirror assembly. Such a mirror assembly would preferably increase the pull-in angle so as to increase the effective deflection rage of the mirror.

SUMMARY OF THE INVENTION

The invention includes a mirror assembly of micron dimensions for use in deflecting a beam of light. The mirror assembly includes a planar base and a planar mirror spaced apart from the planar base and disposed generally parallel to the planar base. The planar mirror has first and second end portions and a longitudinal axis extending between the first and second end portions. First and second torsional members extend along the longitudinal axis and are connected to the respective first and second end portions for permitting the mirror to rock between first and second positions about the longitudinal axis relative to the planar base. Means is included for securing the first and second torsional members to the planar base. At least a portion of the mirror is made from a conductive material. First and second spaced-apart electrodes are carried by the planar base for driving the mirror between the first and second positions. A tether member extends transversely of the longitudinal axis and is secured to the first torsional member. Means is provided for securing the tether member to the planar base. The ether member regulates the rocking of the mirror.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals. The vertical scale of FIGS. 1–3, 8–12 and 16, where shown, has been exaggerated to facilitate understanding of the drawings.

DETAILED DESCRIPTION OF A PREFERRED EMBODIMENT OF THE INVENTION

Figure 1:
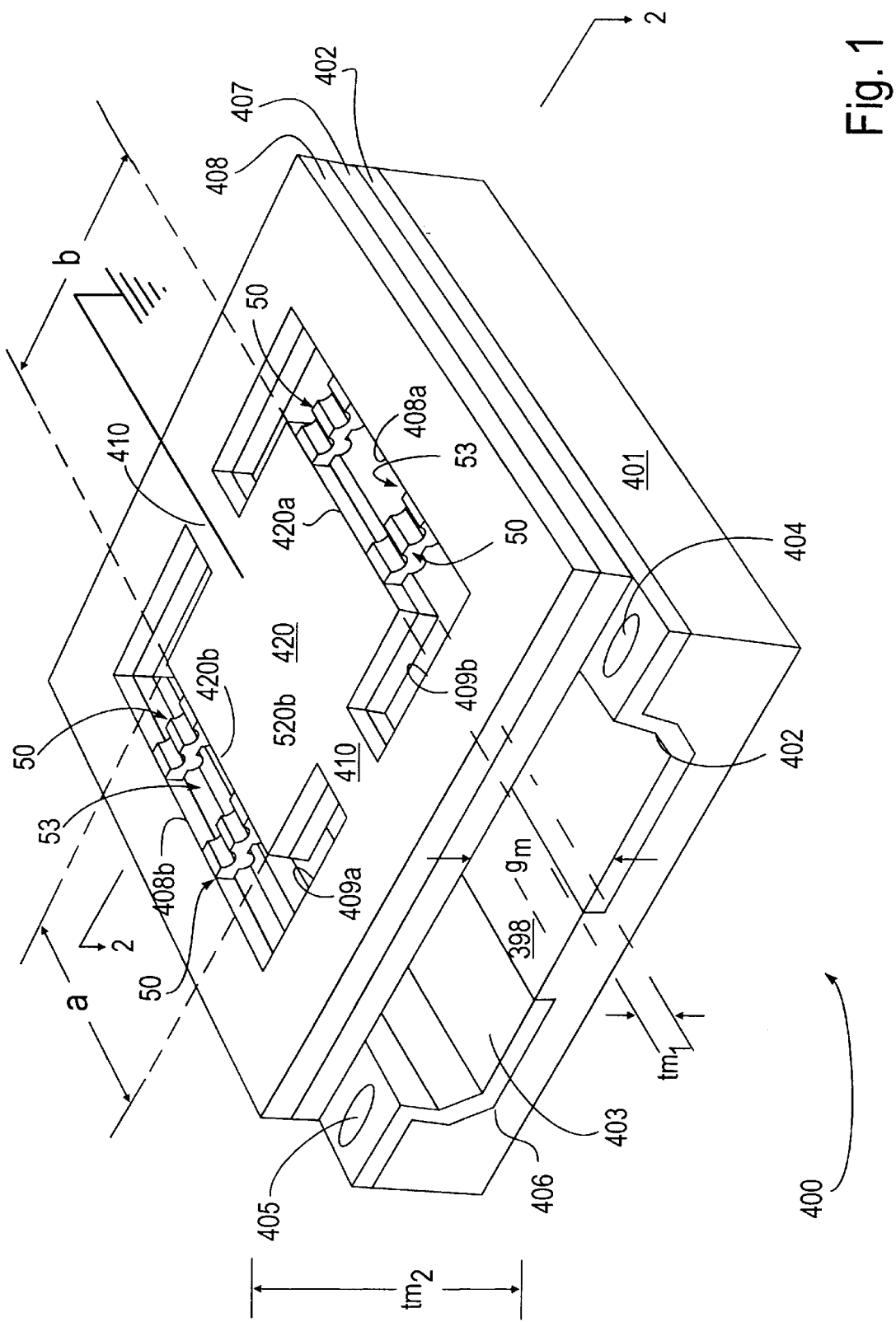
FIG. 1 is an isometric view of a micromachined mirror assembly.

Referring in detail now to the drawings wherein similar parts of the invention are identified by like reference numerals, there is seen in FIG. 1 a micromachined mirror assembly 400 of the present invention. The steerable micromachined mirror assembly 400 includes a silicon substrate 401 that has a recess 406 therein. A spaced apart pair of planar rive (actuation) electrodes broadly and generally illustrated as 402 and 403 are disposed along the bottom of the recess 406. A planar silicon plate 407 is bonded to respective portions of the electrodes 402, 403. A planar flexure layer 408 made from a material such as silicon dioxide or silicon nitride is bonded to the outward face of the plate 407. Flexure layer 408 is formed to comprise opposed annular portions 408a and 408b.

An outward facing reflective central mirror portion 420 is defined in a portion of the top flexure layer 408 and a respective portion of the inner silicon plate layer 407 by spaced apart opposing C-shaped aperture slots 409a, 409b formed therethrough. The reflective central mirror portion 420 is configured to provide integral opposed halves or end portions 420a and 420b. The opposed halves 420a and 420b are symmetrically disposed about an distally extending from an axis formed by a pair of axially aligned, opposed flexure layer hinges 410.

The flexure layer hinges 410 are integrally formed from the fixture layer 408 and provide torsional restoring torque to the reflective central mirror portion 20. The reflective central mirror portion 420 may be metalized with gold or a similar substance to increase the optical reflectivity and to improve electrostatic actuation of the reflective central mirror portion 420.

In an exemplary embodiment, the steerable micromachined or assembly 400 operates over a bandwidth of approximately 20 to 200 KHz with an application to electrodes 402 and 403 of an actuation voltage of approximately 90 to 200 volts. The reflective central mirror portion 420 is a generally parallelogrammatic structure that includes: a linear dimension, a and b, that is approximately 300 microns or less; and a thickness, tm1, that is approximately 3 microns or less. The gap spacing between the bottom of the reflective central or portion 420 and the drive electrodes 402 and 403, gm, is approximately 10 microns or less. In the exemplary embodiment, an outside thickness of the steerable micromachined mirror assembly 400, tm2, is approximately 200 microns or less. In the exemplary embodiment, the reflective central mirror portion 420 achieves a preferable physical angular rotation of at least ±2 degrees about a longitudinal axis defined by hinges 410. Preferably, the reflective central mirror portion 420 may be driven torsionally without any excessive transverse motion and should maintain an optical flatness of lambda/10 during static and/or upon dynamic operation. The maximum stress upon electrostatic deflection should be below the expected yield stress of the material of flexure layer 408. The aforementioned characteristics and dimensions of the steerable micromachined mirror assembly 400 are meant to be exemplary in nature and should be limited by the scope of the ensuing claims only.

In an exemplary embodiment, the steerable micromachined or assembly 400 may be fabricated by etching the recess 406 into the silicon substrate wafer 401. The silicon plate 407 may be oxide bonded to achieve electrical isolation from the electrodes 402, 403 and may be subsequently thinned and polished to a desired thickness. The flexure layer 408 may be deposited and patterned to define the periphery of the reflective central mirror portion 420 and the width of the hinge 410. An isotropic etch may be used to form the aperture slots 409a, 409b around reflective central mirror portion 420 and beneath the flexure hinges 410, while leaving the silicon plate 407 under the reflective central mirror portion 420 to provide rigid support. The etch step may be used to provide access to electrodes 402 and 403 so that the bonding pads 404 and 405 may be formed by a deposition of metal to electrically and mechanically connect to the respective electrodes 402, 403. While the steerable micromachined mirror assembly 400 has been described as being fabricated using bulk micromachining techniques, surface micromachining techniques may also be used, for example, surface micromachining techniques as disclosed in "Design techniques for surface micromachining MEMS processes," J. Comtois et al., 1991 SPIE Proceeding Series Volume 2639, pp. 211–222.

Figure 2:
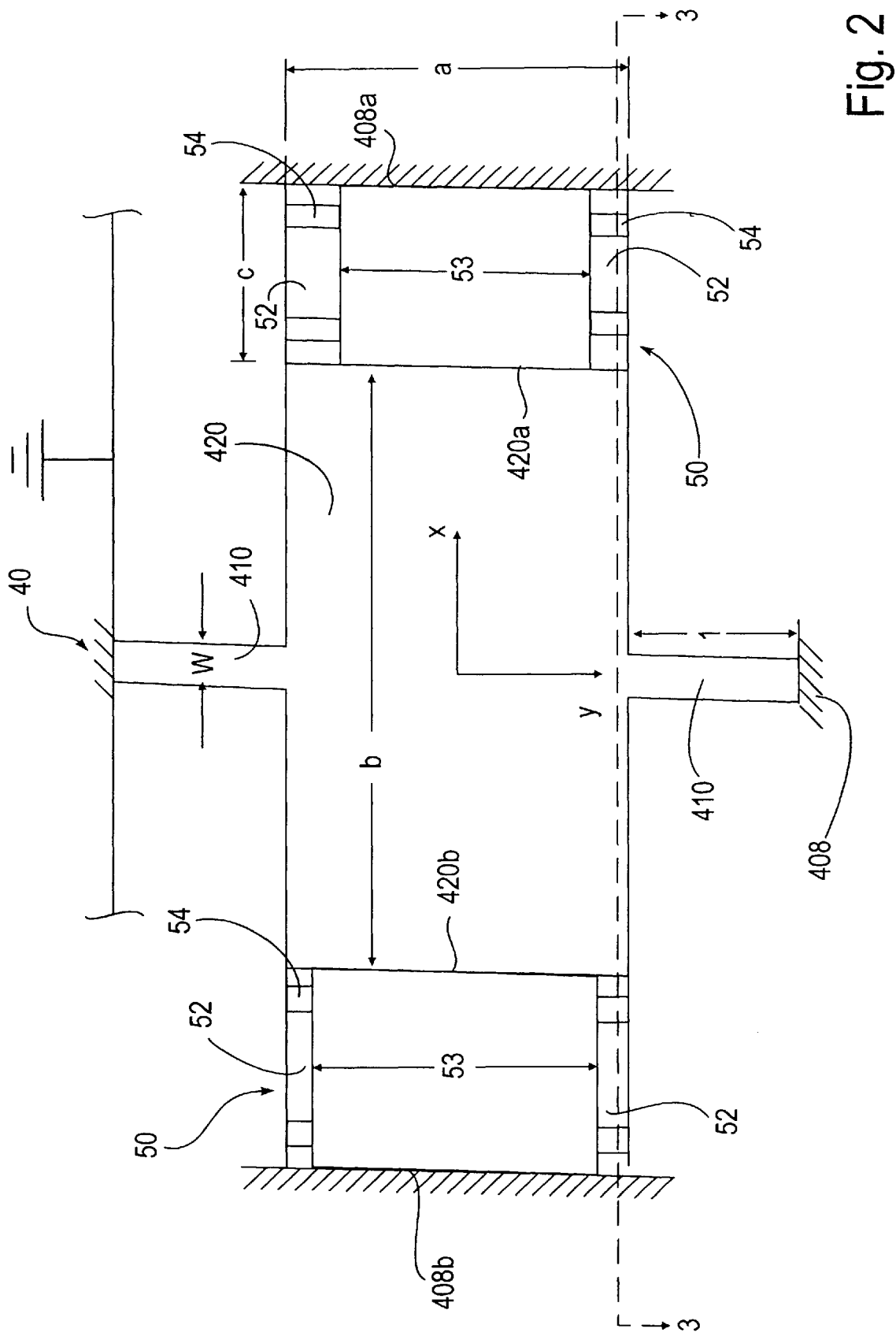
FIG. 2 is a top plan view of the micromachined mirror assembly of FIG. 1 taken along the line 2—2 of FIG. 1.
Figure 3:
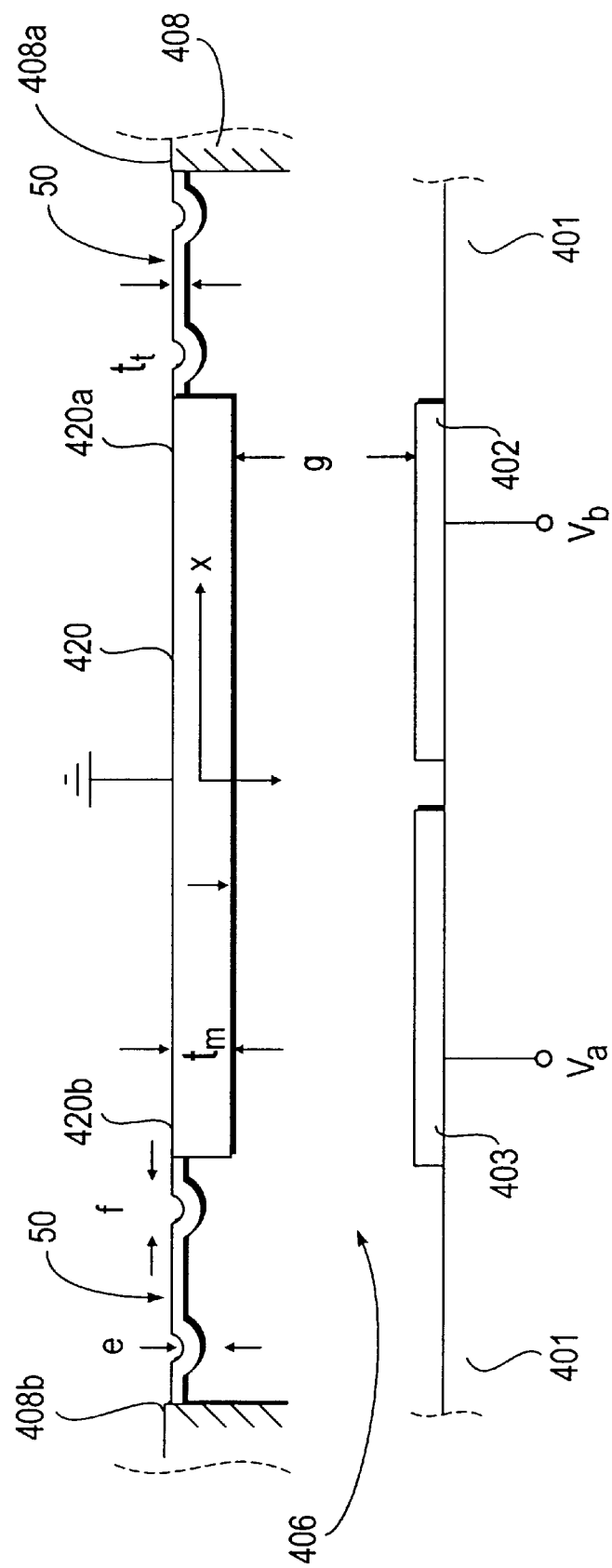
FIG. 3 is a vertical cross-sectional view of the micromachined mirror assembly of FIG. 2 taken along the line 3–3 of FIG. 2.

Referring now to FIGS. 1–3, the steerable micromachined mirror assembly 400 may include at least one tether member 50 for further coupling the reflective central mirror portion 420 to the flexure layer 408. More specifically, the at least one tether member 50 respectively couples a respective at least one of the opposed annular portions 408a and 108b of the flexure layer 408 to the respective opposed halves 420a and 420b of the reflective central mirror portion 420.

Each tether member 50 may be a parallelogrammatic structure 52 having at least one, preferably a pair of transverse channels 54. As shown in FIG. 1, distal edges of opposed halves 420a and 420b each have a pair of spaced apart tethers 52 secured hereto, separated by gap 53.

The grooves or channels 54 may be plasma etched using a planar etch to define isotropically etched contours within a selected surface area of flexure layer 408. An etch stop may be diffused into the convoluted surface so that the etched contours follow the etch-stop layer. The flexure layer 408 portion that includes the tether member 50 may be patterned and etched from the surface opposed to that of channels 54, with the etch stop layers producing the desired corrugated cross-section. With conventional plasma etching techniques, etched groove depths may be produced from a fraction of a micrometer to about 50 micrometer. If boron etch stops are used, the available tether member 50 thickness may range from about 0.5 micrometer to about 10 micrometer. A similar range is available with diffused electrochemical etch stops, although the maximum thickness can be increased above 20 micrometer with sufficiently long diffusions.

The tether members 50 permit torsional motion of the reflective central mirror portion 420 about axially aligned flexure layer hinges 410, but limit transverse motion; that is, the tether member 50 limits movement of the distal edges of reflective central mirror portion 420 towards sides 408a and 408b of the flexure layer 408. The tether member 50 also provides a torsional restoring force (in addition to that provided by flexure layer hinges 410) to return the reflective central mirror portion 420 to an undeflected position. The tether member 50 also limits the reflective central mirror portion 420 from contacting the actuation electrodes 402 and 403 in a high drive situation, along with preventing contact deformation and warping of the reflective central mirror portion 420. The tether member 50 further prevents the reflective central mirror portion 420 from deflecting beyond a critical angle which would otherwise result in spontaneous deflection to one of the actuator electrodes 402 or 403.

Rotation or torsional movement of the reflective central mirror portion 420 causes the tether members 50 to deflect downwards (z-direction) while remaining attached to the sides 420a and 420b of the reflective central mirror portion 420. In order to remain attached, tether members 50 preferably stretch somewhat to accommodate the increased distance from the sides 420a and 420b of the reflective central mirror portion 420 to the sides 408a and 408b of the flexure layer 408.

Considering a single tether 50 acting as a beam and temporarily ignoring the presence of the grooves or channels 54 for small deflections, the amount of force required to deflect the beam in the z-direction is approximately linearly proportional to the amount of deflection realized. For larger deflections, this relationship may be non-linear, with larger incremental amounts of force required to obtain incremental deflections. The non-linearity of the tether member 50 may be tailored to meet the non-linearity in electrostatic torque caused by large angular rotations of the reflective central mirror portion 420. Accordingly, the range of stability of the reflective central mirror portion 420 with respect to its angular deflection may be increased and a wider range of angular deflection may be realized by deterring effects of the electrostatic non-linearity for larger angular deflections.

The restoring torque available from the torsional hinges 410 alone may be insufficient at times to counteract the torque exerted by the electrostatic field at some critical rotation angle. The tether members 50 serve to provide additional restoring torque to combine with the hinge restoring torque, thus offsetting the electrostatic torque. Therefore the point of instability can be changed to occur at larger deflection angles. Also, the resonant frequency of the reflective central mirror portion 420 is preferably increased due to the additional effective torsional spring constant created by the tether members 50. Hence, the resonant frequency is somewhat further decoupled from the actuation voltage.

In designing the tether members 50, the non-linearity of the tether members 50 dominates at roughly the same angular deflection that causes the electrostatic force to dominate. In an embodiment where the tether members are straight beams, the tether 50 stretches significantly; therefore, the non-linearity in the deflection of the beam deflection becomes apparent for rather small reflective central mirror portion 420 angles. The use of transverse channels 54 serves to extend the linear range of the tether member 50 by allowing for the stretching to be largely accommodated by the bend in the corrugation. Onset of effective non-linearity in the tether member 50 is a function of the length c of the tether member 50, it width d, its thickness t, the depth e, the width f and the number of corrugations. By including the transverse channels 54, the tether member 50 further allows design flexibility in determining the onset of non-linearity. Note, however, that in certain situations the increased linear range afforded by the transverse channels 54 is undesirable in that a stronger nonlinear response is preferred. In such situations, the transverse channels 54 may be eliminated and the tether 50 takes on the shape of a flat beam. Preferably, the tether thickness t is made smaller than the thickness of the reflective central mirror portion 420 so that the non-linear force from the tether member 50 does not cause excessive warping of the reflective central mirror portion 420.

Figure 4:
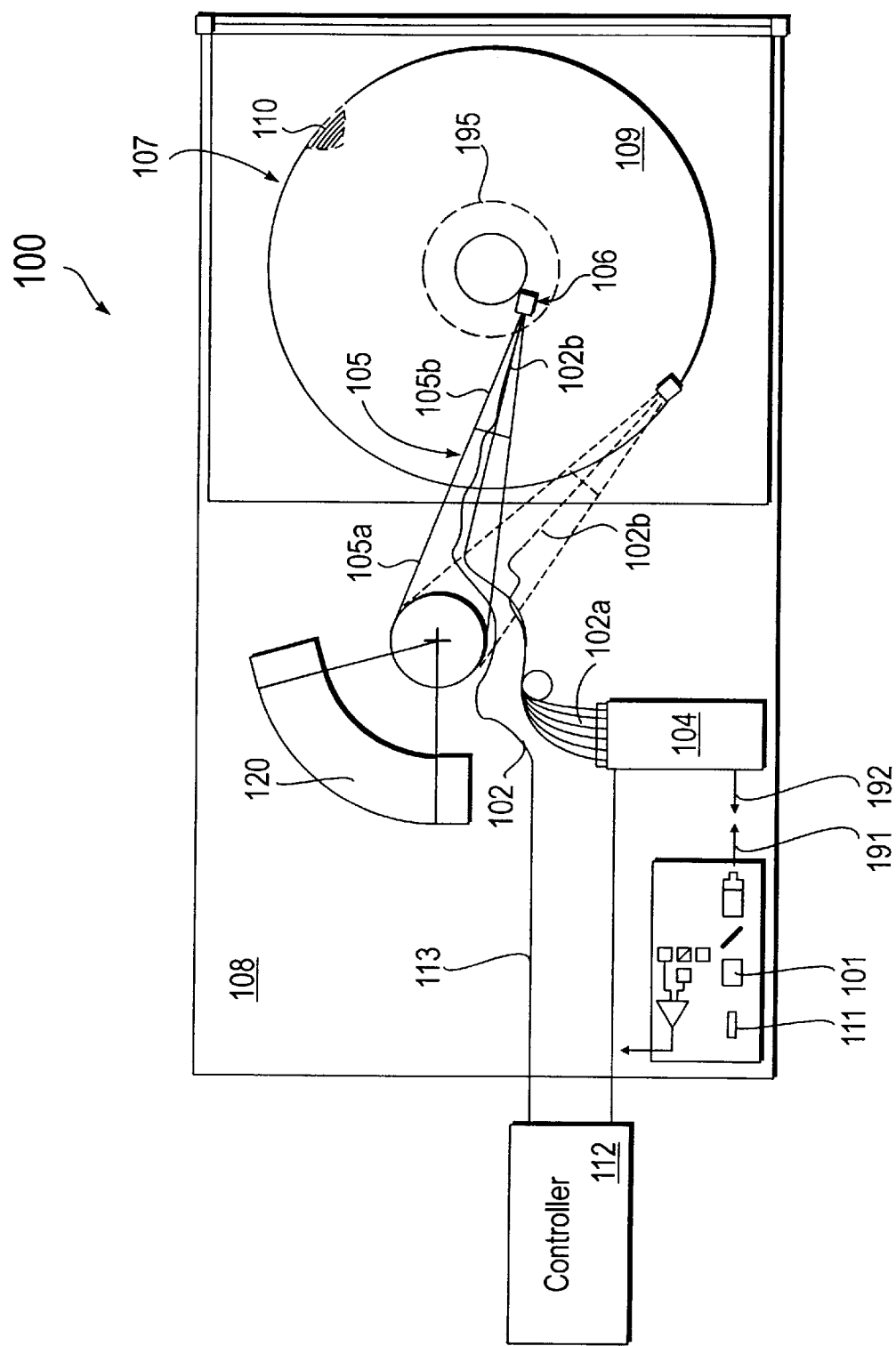
FIG. 4 is a top plan view, somewhat schematic, of one preferred embodiment of a magneto-optical storage system of the present invention.

Mirror 400 can be used with any suitable optical data storage system, such as the magneto-optical data storage and retrieval system shown in FIG. 4. In one preferred embodiment, magneto-optical (MO) data storage and retrieval system 100 includes a set of Winchester-type flying heads 106 that are adapted for use with a set of double-sided magneto-optical disks 107, one flying head for each MO disk surface. MO disks 107 are rotatably carried in a stack by a support body 108 and for simplicity only one of the disks 107 is shown in FIG. 4. In a preferred embodiment, a set of six disks 107 are provided in a stack. Each side of a disk 107 has a planar storage surface 109 provided with a plurality of concentrically disposed data tracks 110 thereon. For simplicity, only several of the data tracks 110 are shown in FIG. 4 and have been enlarged relative to the size of disk 107 for permitting visualization thereof.

The set of flying heads or flying MO heads 106 are coupled to a rotary actuator magnet and coil assembly 120 by an actuator arm 105 so as to be positioned over the respective planar storage surfaces 109 of the MO disks 107. Each arm 105 has a rigid proximal extremity 105a pivotably mounted on support body 108 so as to permit a distal extremity or flexible suspension 105b to pivot between a first position, shown in solid lines in FIG. 4, a second position spaced apart from the first position, shown in dashed lines in FIG. 4. It should be appreciated that the two positions shown in FIG. 4 are merely exemplary and that arms 105 are movable to any number of other positions relative to support body 108. The flying heads 106 are mounted to suspensions 105b of the arms 105.

In operation, the set of MO disks 107 are rotated by a spindle motor 195 so as to generate aerodynamic lift forces between the set of flying MO heads 106 and so as to maintain the set of flying MO heads 106 in a flying condition adjacent the respective storage surface 109. More specifically, each flying head is less than or equal to approximately 15 micro-inches above the respective upper or lower surface 109 of the set of MO disks 107. The lift forces are opposed by equal and opposite spring forces applied by the set of suspensions 105b. During non-operation, the set of flying heads 106 are maintained statically in a storage condition or position, not shown, away from the surfaces of the set of MO disks 107.

System 100 further includes a laser-optics assembly 101 and an optical switch 104 mounted on support body 108 and a set of single-mode polarization maintaining (PM) optical element or fibers 102 carried by the arms 105. Optical fibers 102 are included in the optical light emitter and receiver carried by the suspensions 105b of arms 105. In the exemplary embodiment, each of the set of single-mode PM optical fibers 102 has a proximal extremity 102a coupled to optical switch 104 and a distal extremity respectively coupled through a respective one of the set of actuator arms 105 and suspensions 105b to a respective one of the set of flying heads 106 for transmitting laser beams 191,192 between support body 108 and flying heads 106. Assembly 101 has a suitable laser source 111 such as a linearly polarized laser source, that is preferably a Fabry-Perot or a distributed feed-back (DFB)laser source, for producing an outgoing laser beam 191. Laser source 111 is selected to operate within a range of 635–685 nanometers, however a laser source of other wavelengths could also be used. Use of the optical switch 104, the set of flying heads 106, and the set of single-mode PM optical fibers 102 is described in commonly assigned U.S. patent application Ser. No. 08/844, 208 filed Apr. 18, 1997, the entire contents of which are incorporated herein by this reference. A controller 112 is electrical coupled to optical switch 104 by means of wires 113 for providing electrical command signals to the optical switch. The controller 112 is electrically coupled to optical switch 104 by means of wires 114.

Each of the flying heads 106 includes a slider body 244, an air bearing surface 247, a quarter-wave plate 251, a surface micromachined steerable mirror assembly (μMM) 200, objective optics 246, a magnetic coil 260 and a yoke 262 (see FIGS. 2–4). The flying head 106 and the slider body 244 are dimensioned to accommodate the working distances between the objective optics 246, the single-mode PM optical fiber 102 and the reflective substrate or mirror assembly 400. Although slider body 244 may include industry standard "mini", "micro", "nano", or "pico" sliders, alternatively dimensioned slider bodies 244 may also used, as determined by the aforementioned dimensional constraints of the elements used with the flying MO head 106. Accordingly, in the preferred embodiment, the slider body 244 comprises a mini slider height (889 um) and a planar footprint area corresponding to that of a nano slider (1600× 2032 um).

The single-mode PM optical fiber 102 is coupled to the slider body 244 along an axial cutout 243 and the objective optics 246 is coupled to the slider body 244 along a vertical corner cutout 211. Although in the preferred embodiment the axial cutout 243 is located along a periphery of the slider body and the vertical cutout 211 is located at a corner of the slider body 244, the axial cutout 243 and the vertical cutout 211 may be located at other positions on the flying head 106, for example between the periphery and a central axis or alternatively along the central axis itself. Those skilled in the art will recognize that positioning the optical fiber 102 and the objective optics 246 at other than along a central axis may function to affect a center of mass of the magneto-optical head 106 and thus its flying dynamics. Accordingly, the point of attachment of the flying MO head 106 to the suspension may require adjustment to compensate for off-center changes in the center of mass of the magneto-optic head 106. Preferably, the cutouts 243 and 211 may be designed as channels, v-grooves or any other suitable configuration for coupling and aligning the single-mode optical fiber 102 and objective optics 246 to the flying head 106.

Figure 5:
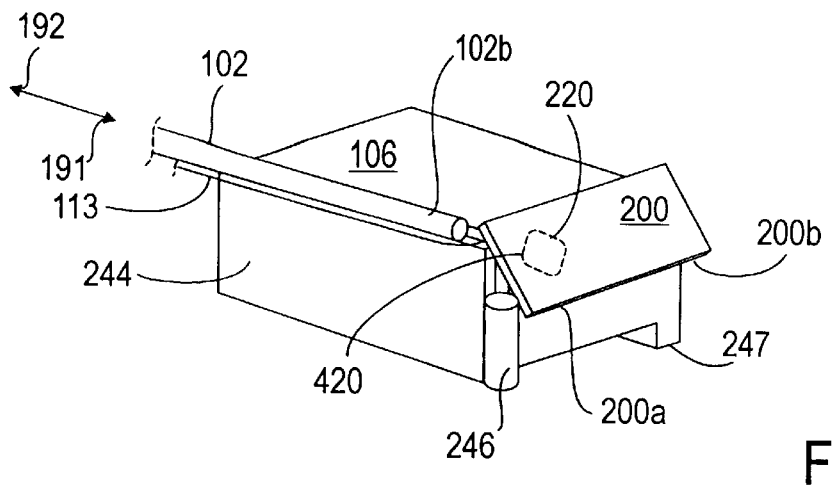
FIG. 5 is an isometric view of a magneto-optical system slider head of the magneto-optical storage system of FIG. 4 having one embodiment of a steerable micromachined mirror assembly mounted thereon.
Figure 6:
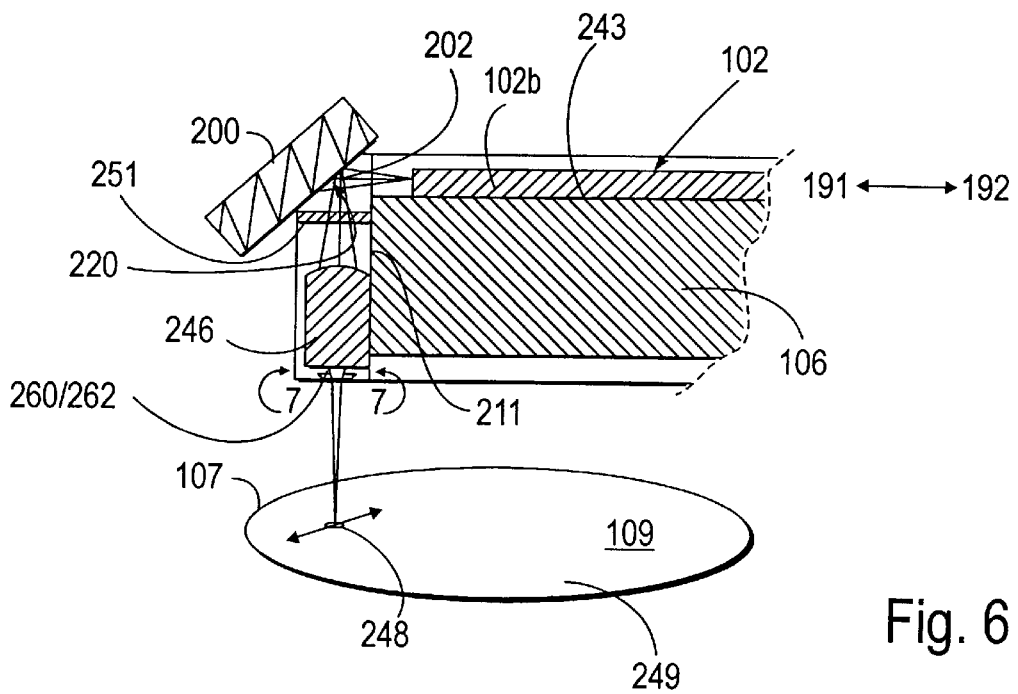
FIG. 6 is a cross-sectional view of the magneto-optical system slider head of FIG. 5.

Mirror assembly 400 can be attached to slider body 244 in the same manner that an alternate mirror assembly 200 is shown attached to slider body 24 in FIG. 5. As more fully discussed below, mirror assembly 200 includes a small reflective mirror 220, shown in FIG. 5 on a side of the mirror assembly 200 opposite to that which is visible and thus illustrated in dashed lines. In the preferred embodiment, outgoing laser beam 191 and incoming or return laser beam 192 traverse an optical path to and from the surface recording layer 245 on surface 109 of the MO disk 107 that includes the single-mode PM optical fiber 102, the mirror assembly 200, the quarter-wave plate 251 and the objective optics 246. The outgoing laser beam 191 is emitted from optical fiber distal extremity 102b as a Gaussian beam.

During writing of information, the outgoing laser beam 191 is selectively routed by the optical switch 104 to the MO disk 107 so as to lower a coercivity of the recording/storage layer 249 by heating a selected spot of interest 248 to approximately the Curie point of the recording/storage layer 249. Preferably, the optical intensity of outgoing laser beam 191 is held constant, while a time varying vertical bias magnetic field is created by coil 260 to define a pattern of "up" or "down" magnetic domains perpendicular to the MO disk 107. This technique is known as magnetic field modulation (MFM). Subsequently, as the selected spot of interest 248 cools, information is encoded within the recording/ storage layer 249 of the respective spinning disk 107.

During readout of information, the outgoing laser beam 191 (at a lower intensity compared to writing) is selectively routed to the MO disk 107 such that at any given spot of interest 248, the Kerr effect causes (upon reflection of the outgoing laser beam 191 from the recording/storage layer 249) a reflected laser beam 192 to have a rotated polarization of either clockwise or counter clockwise sense that depends on the magnetic domain polarity at the spot of interest 248.

The aforementioned optical path is bidirectional in nature. Accordingly, the reflected laser beam 192 is received through the flying head 106 and enters the distal end 102b of the single-mode PM optical fiber 102. The reflected laser beam 192 propagates along the single-mode PM optical fiber 102 to exit at its proximal end 102a and is selectively routed by the optical switch 104 for transmission to laser-optics assembly 101 for subsequent conversion to an electrical signal.

Micromachined mirror assembly or mirror assembly 200 cm be of the type disclosed in copending U.S. patent application Ser. No. 09/192,006 filed Nov. 13, 1998 [File No. A-66166-1], the entire contents of which are incorporated herein by this reference. Mirror assembly 200 has a size and shape similar to a semiconductor chip and is of micron dimensions. Mirror assembly 200 has first and second extremities or end portions 200a and 200b and has first and second parallel sides 296 and 297 forming the end surfaces of the extremities 200a and 200b and third and fourth parallel sides 298 and 299 extending between the extremities 200a and 200b (see FIG. 8). First end portion 200a is referred to as working area 200a and second end portion is referred to as slider attach area 200b herein. Mirror assembly 200 can have a length between sides 296 and 297 ranging from 500 to 3000 microns and preferably approximately 1850 microns, a width between sides 298 and 299 ranging from 300 to 1000 microns and preferably approximately 650 microns and a height between its top and bottom surfaces ranging from 75 to 600 microns and preferably approximately 175 microns.

Mirror assembly 200 has a planar base 301. Planar mirror 220 is spaced apart from and parallel to the planar base 301 and has first and second end portions 220a and 220b and a central longitudinal axis 303 extending between such end portions (see FIGS. 8–10). The longitudinal axis 303 extends through the center of mirror 220 and perpendicular the longitudinal axis of mirror assembly 200. Mirror further includes first and second halves symmetrically disposed on longitudinal or rotational axis 303.

First and second torsional members 306 and 307 are secured to respective first and second end portions 220a and 220b of mirror 220. The torsional members or hinge members 306 and 307 each extend along longitudinal axis 303 and permit the mirror 22 to rock about longitudinal axis 303 between first and second deflected positions relative to planar base 301. The mirror 220 passes through its home or planar position, shown in FIGS. 8–10, as it travels between its first and second deflected positions. Securing means, as more fully discussed below, is included within mirror assembly 200 for securing the first and second hinge members or hinges 306 and 307 to planar base 301.

Planar base 301 has a first or substrate layer 311 which serve as the rigid support for the laminar structure of mirror assembly 200. Substrate 311 has the shape of a parallelepiped. Substrate 311 has a length and width which define the length and width of mirror assembly 200 and has a thickness ranging from 75 to 600 microns and preferably approximately 175 microns. The relatively thick substrate can be formed from any suitable material such as silicon, quartz and other relatively high-temperature glasses and in a preferred embodiment substrate 311 is formed from N-type silicon in wafer form.

Figure 10:
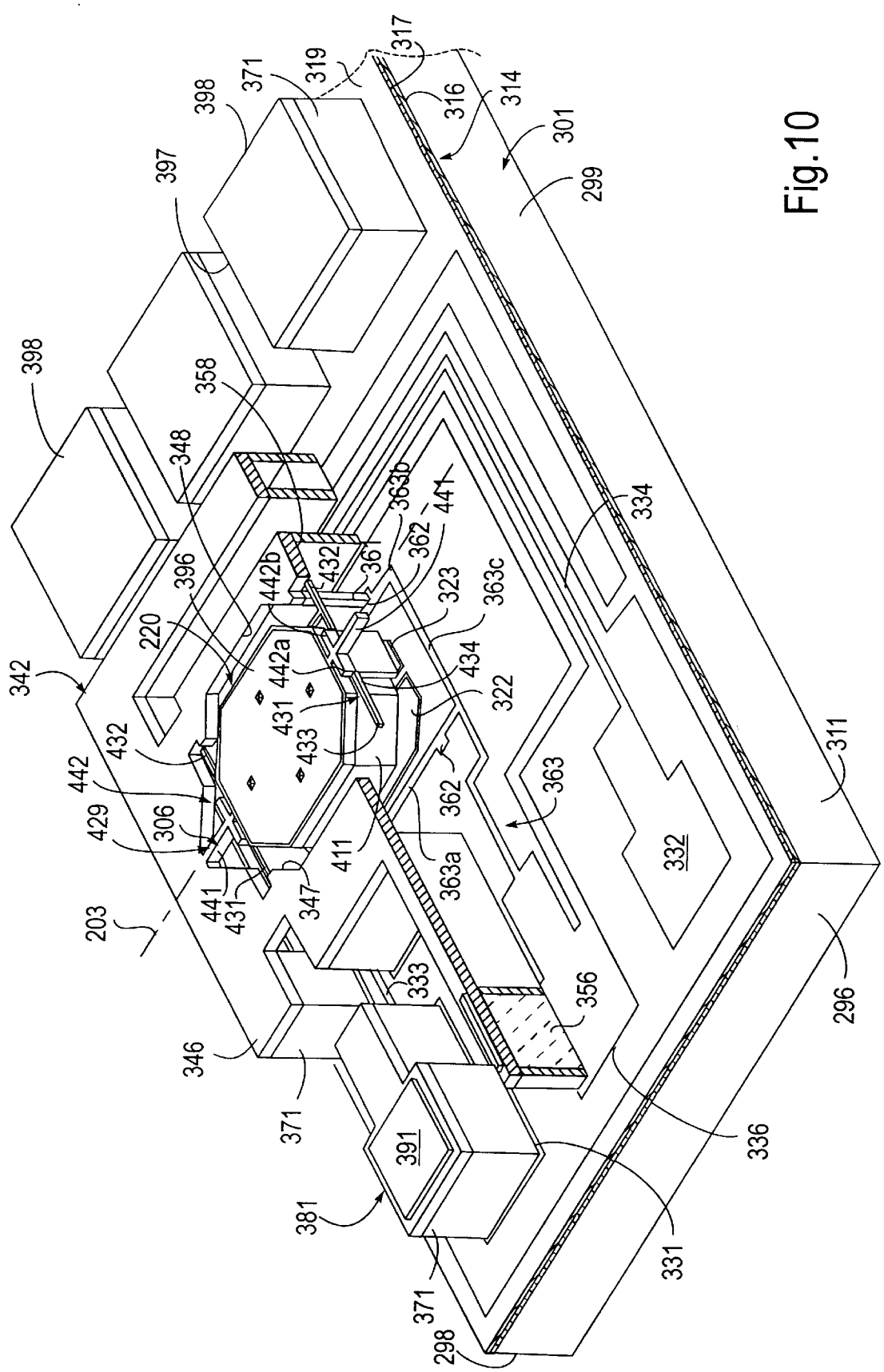
FIG. 10 is an isometric view, partially cut away, of a portion of the micromachined mirror assembly of FIG. 8.

A layer 314 formed from at least one layer of a dielectric material overlies the substrate 311 and is included in planar base 301 (see FIG. 10). In one preferred embodiment of mirror assembly 200, dielectric layer 314 is a laminate which includes a thin layer of silicon dioxide 316 disposed atop substrate 311 and a thin layer 317 of any suitable acid etch-resistant dielectric material, preferably a hydrofluoric acid-resistant dielectric material such as silicon nitride, overlying the silicon dioxide layer 316. Silicon dioxide layer 316 has a thickness ranging from 300 to 500 nanometers and preferably approximately 300 nanometers. Silicon nitride layer 317 has a thickness ranging from 200 to 300 nanometers and preferably approximately 250 nanometers. The dielectric layer 314 can alternatively consist solely of a layer of silicon nitride. In other embodiments of mirror assembly 200, the dielectric layer 314 can consist of one or more layers of any other suitable dielectric material.

A patterned layer 319 made from any suitable conductive material such as polysilicon is disposed atop dielectric layer 314 (see FIG. 10). Planar polysilicon layer 319 has a thickness ranging from 100 to 300 nanometers and preferably approximately 250 nanometers. The patterned layer 319 has spaces therein to form, among other things, first and second drive electrodes 322 and 323 which in the finished mirror assembly 200 are spaced below mirror 220. First and second electrodes 322 and 323 have an aggregate shape in plan which is octagonal and approximates the octagonal shape of mirror 220. Such aggregate octagonal shape of drive electrode 322 and 323 is smaller than the octagonal shape of mirror 220. First and second conductive pads 331 and 332 and first and second conductive traces 333 and 334 are formed by polysilicon layer 319 on planar base 301. A first electrical trace 333 extends from first conductive pad 331 to first drive electrode 322 and a second electrical trace 334 extends from second conductive pad 332 to the second drive electrode 323. A third conductive pad 336 is formed by polysilicon layer 319 between first and second conductive pads 331 and 332.

Figure 8:
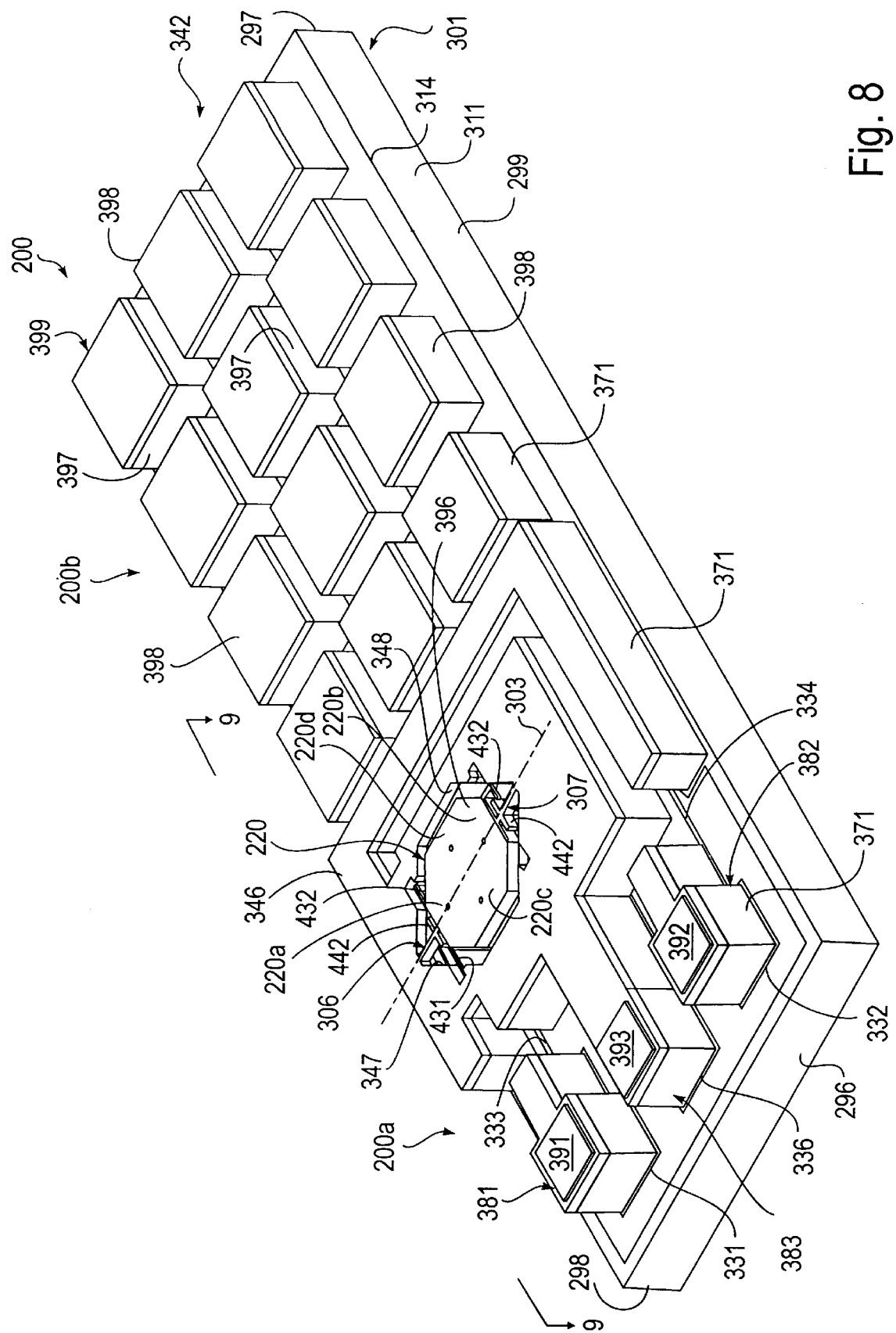
FIG. 8 is an isometric view of another embodiment of a micromachined mirror assembly suitable for use with the optical head of FIG. 5.
Figure 9:
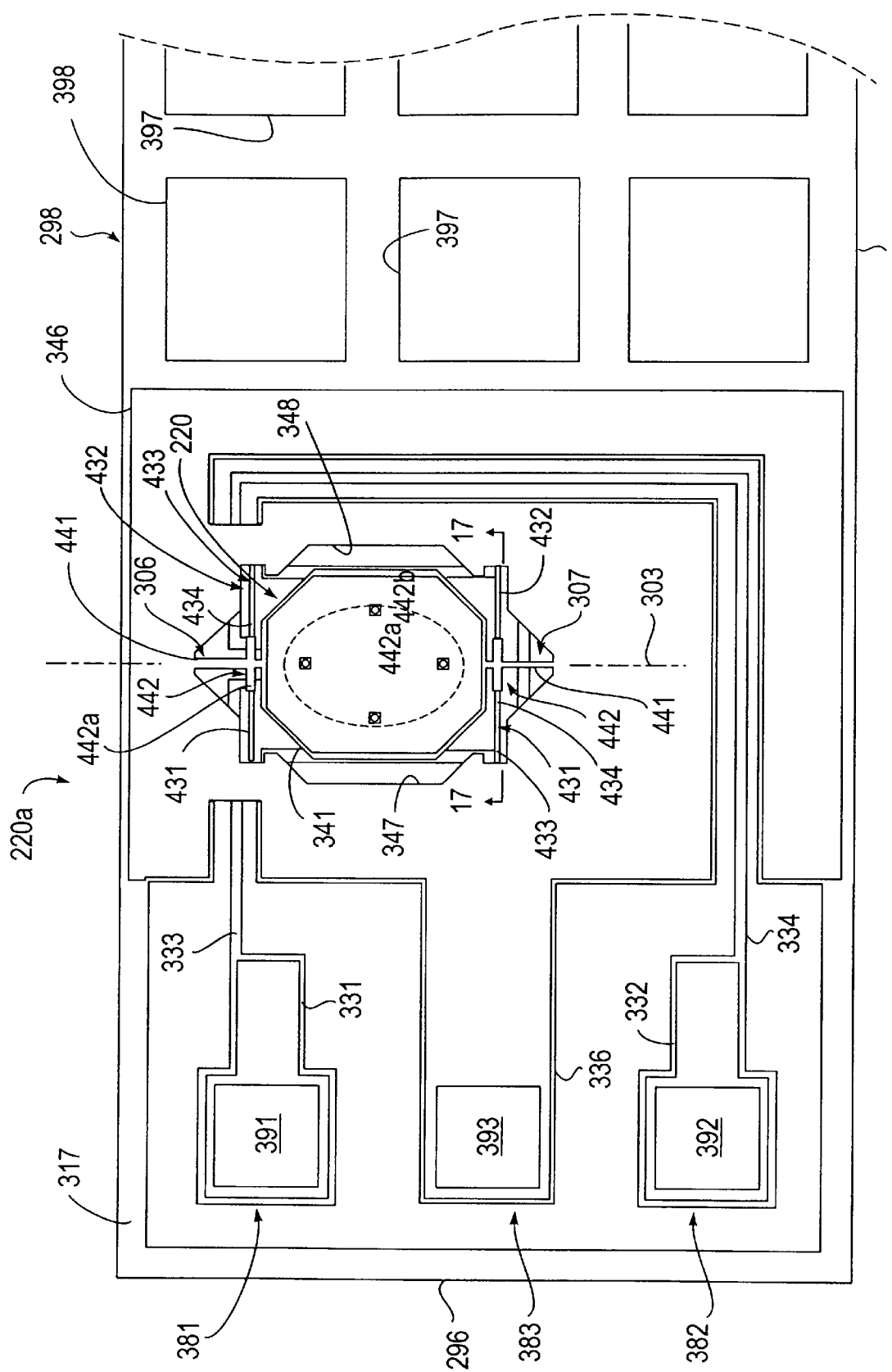
FIG. 9 is a top plan view of a portion of the micromachined or assembly of FIG. 8 taken along the line 9–9 of FIG. 8.

Working area 200a of the mirror 220 includes a mirror platform 341 formed from an upper layer 342 of material spaced above and parallel to planar base 301 (see FIGS. 8–10). First and second hinges 306 and 307 are also formed from plate layer 342 and are each secured to the mirror platform 341 at one end and the inner edges of the frame 346 at the other end. A peripheral portion or frame 346 formed from upper layer 342 extends around mirror platform 341. Frame 346 is disposed in working area 200a and is provided with first and second substantially C-shaped apertures 347 and 348 extending therethrough for forming mirror platform 341 and first and second hinges 306 and 307. More specifically, apertures 347 and 348 have shapes resembling parentheses. Apertures 347 and 348 are symmetrically disposed about central longitudinal axis 303. Upper layer 342 is made from any suitable conductive material such as polysilicon and has a thickness ranging from 1.5 to 2.5 microns and preferably approximately 2.0 microns. Frame 346 has a length measured perpendicular to mirror axis 303 ranging from 400 to 700 microns and preferably approximately 580 microns and a width ranging from 400 to 650 microns and preferably approximately 650 microns.

The conductive mirror platform 341 serves as an additional or ground electrode and has a shape in plan which is substantially elliptical and more specifically octagonal. The elongated octagonal shape of mirror platform 341 and mirror 220 is at least a large as the spot, shown in phantom lines in FIG. 9, created thereon when mirror 220 is disposed at an angle of 45° in the path of laser beams 191,192. The mirror platform has a length at its center along central longitudinal axis 303 ranging from 170 to 250 microns and preferably approximately 220 microns and a width at its center extending perpendicular to longitudinal axis 303 ranging from 140 to 200 microns and preferably approximately 170 microns. First and second hinges 306 and 307 each have a length measured along longitudinal 303 ranging from 15 to 60 microns and preferably approximately 50 microns and a width ranging from 1 to 8 microns and preferably approximately three microns.

At least one patterned layer of any suitable sacrificial material such as phosphosilicate glass (PSG) is disposed between the patterned portions of plate layer 342 and planar base 301. Such PSG or spacer layer 356 is disposed atop layer 319 and has a thickness ranging from 8 to 13 microns and preferably approximately 10 microns. PSG layer 356 is removed below mirror platform 341 and a portion of frame 346 to provide a space or chamber 358 inside mirror assembly 200 (see FIG. 10). Chamber 358 extends to polysilicon layer 319 and the exposed portions of planar base 301 in these areas. As such, mirror platform 341 is spaced apart from dielectric layer 314 and spaced above first and second drive electrodes 322 and 323. The drive electrodes are exposed to the bottom of the mirror platform 341.

Means is included within mirror assembly 200 for securing frame 346 and first and second hinges 306 and 307 interconnecting frame 346 and mirror platform 341 to planar base 301. In this regard, a plurality of posts 361 extend perpendicularly between the underside of the frame and the planar base for anchoring the plate layer 342 to the planar base 301. One of such posts 361 is shown in FIG. 10. Posts 361 are each made from any suitable material and in the embodiment illustrated are made from a conductive material. More specifically, posts 361 are made from polysilicon and are secured to plate layer 342. Each of the posts 361 rests on a landing pad 362 formed from polysilicon layer 319 and electrically coupled to ground conductive pad 336 by a conductive trace 363 also formed from the polysilicon layer 319. First and second portions 363a and 363b of ground trace 363 extend respectively along the length of the outer sides of first and second drive electrodes 322 and 323. A third portion 363c the trace 363 extends perpendicularly between portions 363a and 363b adjacent second end portions 322b and 323b of the drive electrodes 322 and 323. The means for securing or anchoring frame 346 to planar base 301 further includes a plurality of wall-like members or walls 371 extending between plate layer 342 and the planar base 301 (FIGS. 8 and 10). Walls 371 are each made from any suitable material such as a conductive material. More specifically, the walls 371 are made from polysilicon and are secured to plate layer 342. Each of the walls sits on a pattered portion of polysilicon layer 319.

Plate layer 342 and walls 371 further serve to form a plurality contact platforms 381, 382 and 383 for providing electrical signals to respective conductive or interconnect pads 331, 332 and 336. A thin layer of at least one conductive material is deposited on the top of platforms 381–383 by any suitable means to provide respective first and second contact pads 391 and 392 and ground contact pad 393 thereon. Each of such contact or bond pads preferably consists of a thin layer of chromium disposed on plate layer 342 and having a thickness of approximately 10 nanometers and a thicker layer of gold having a thickness of approximately 500 nanometers placed on top of the chromium layer. Ground contact pad 393 is used to ground mirror platform 341.

A thin layer 396 is placed or deposited on top of mirror platform 341 for providing a surface of optical quality. Layer 396 is comprised of one or more thin layers of material that in combination create high reflectivity at the wavelength of the laser light. Specifically, layer 396 includes a thin layer of chromium having a thickness of approximately 5 nanometers deposited on the top of mirror platform 341 by any suitable means. A thicker layer of gold having a thickness of approximately 100 nanometers is deposited on top the chromium layer by any suitable means and is further included in the thin layer 396.

Slider attach area 200b of mirror assemblies 200 occupies approximately one half of mirror assembly 200 (See FIG. 8). The slider attach area has a grid of longitudinally and transversely aligned grooves or permanent channels 397 to provide a plurality of plateaus or mesas 398. Plate layer 342 has another portion or remainder portion 399 which forms the top surface of mesas 398 and walls 371 form the sides of the mesas. Mesas 398 are each suitably shaped and dimensioned in plan and in the embodiment illustrated are each square shaped in plan with dimensions of approximately 150 microns by 150 microns.

A plurality of ribs 411 are secured to the bottom of mirror platform 341 for providing rigidity to mirror 220. The ribs 411 are made from any suitable material and preferably made from the same conductive material which forms posts 361 and walls 371. As such, the ribs 411 are made from polysilicon. Ribs 411 extend perpendicular to the bottom of platform 341 toward planar base 301 and preferably extend at least halfway between the mirror platform 341 and planar base 301. A peripheral rib 411 extends completely around the perimeter of the octagonally-shaped mirror platform 341. One or more additional ribs can optionally be provided within the peripheral rib 411. In one preferred embodiment of mirror assembly 200, crossed internal ribs 411 of the type shown in FIG. 10 of copending U.S. patent application Ser. No. 09/192,006 filed Nov. 13, 1998 [File No. A-66166-1] and described therein are additionally provided. The bottom surface of mirror platform 341 is spaced apart from the to surface of first and second drive electrodes 322 and 323 a distance ranging from 4 to 12 microns and preferably approximately 10 microns to provide an air gap between the ribs 41 and the electrodes 322 and 323. The ribs each 411 have a width ranging from 2 to 6 microns and preferably approximately 4 microns and a depth ranging from 4 to 8 microns and preferably approximately 6 microns.

Mirror assembly 200 has means which includes linear and nonlinear suspension 429 for providing a mechanical restoring force that is responsive to the electrostatic force provided by first and second drive electrodes 322 and 323. The linear means or component of suspension 429 includes first and second torsional hinges 306 and 307 for providing a component to such mechanical restoring force that increases linearly with the deflection angle of first and second hinges 306 and 307 and mirror 220. Suspension 429 further includes a nonlinear means or suspension, that is a suspension of any type which provides a restoring force that increases nonlinearly with the deflection angle of first and second hinges 306 and 307 and mirror 220. In this regard, first and second tether members 431 and 432 are secured to at least one of first and second torsional hinges 306 and 307. More specifically, a set of first and second stretchable or tether members or tethers 431 and 432 are preferably secured to each of the first and second torsional hinges 306 and 307 (see FIGS. 9 and 10). The relative magnitudes of the nonlinear component of the restoring torque to the linear component is largely a function of the length, width, and thickness of the tether members 431 and 432.

Each of the flexural members or tethers 431 and 432 is preferably formed integral with plate layer 342. As such, each of the elongate tethers 431 and 432 has an outer end 433 joined to frame 346. In this manner, the frame 346 is included within the means of mirror assembly 200 for securing each of tethers 431 and 432 to planar base 301. Each of the elongate tethers 431 and 432 has an opposite inner end 434 coupled to the respective hinge 306 or 307. As shown most clearly in FIGS. 9 and 10, each of the torsional hinges 306 and 307 is formed with an elongate portion 441 which extends along longitudinal axis 303 between mirror platform 341 and frame 346 and is optionally formed with a flange portion or flange 442 formed integral with elongate portion 441 and extending transversely thereof. Flange 442 has a first end 442a spaced outwardly from elongate portion 441 and a second end 442b spaced outwardly from the elongate portion opposite of first end 442a. Inner end 434 of first tether 431 is secured to first end 442a of the flange 442 and inner end 434 of second tether 432 is secured to second end 442b of the flange. As so formed, flange 442 and the first and second tethers 431 and 432 secured thereto extend along an axis or line disposed transversely to elongate portion 441 and longitudinal axis 303 and preferably disposed perpendicularly to the elongate portion 441 an the longitudinal axis 303.

Each of flanges 442 is sized and shaped so as to be substantially rigid and thus not bend relative to elongate portion 441 during pivoting of mirror 220 about longitudinal axis 303. Each of the substantially rigid flanges 442 preferably has the shape of a parallelepiped and, more specifically, has a half length measured sidewise of the elongate portion 441 ranging from 20 to 100 microns, a width measured parallel to axis 303 ranging from 4 to 8 microns and a depth measured from the upper surface of plate layer 342 extending downwardly ranging from 4 to 10 microns. Flange 442 is preferably spaced apart from mirror platform 341 a distance ranging from 4 to 12 microns or more preferably a distance of approximately 5 microns. The portion of elongate portion 441 between flange 442 and frame 346 can have a cross-sectional size and shape different than the cross-sectional size and shape of the portion of the elongate portion 441 between flange 442 and mirror platform 341. Each of tethers 431 and 432 has a length measured perpendicularly to longitudinal axis 303 ranging from 40 to 100 microns, a width generally corresponding to or narrower than the width of flange 442 and a depth ranging from 0.2 to 1.0 microns. The tethers have a cross-sectional shape so that as to be elastic and bendable along at least a portion of their length and preferably along their entire length.

Although first and second tethers 431 and 432 of suspension 429 are shown as being coupled to each of the first and second torsional hinges 306 and 307, it should be appreciated that a suspension 429 having a single set of tethers 431 and 432 coupled to only one of the hinges 306 or 307 can be provided. Alternatively, first and second tethers can be provided, one tether being coupled to first hinge 306 and the other tether being coupled to second hinge 307 and extending parallel to the first tether in an opposite direction relative to longitudinal axis 303. Other configurations of tethers can alternatively be provided for regulating or limiting the pivotal movement of mirror 220 about longitudinal axis 303. It should be further appreciated that one or more tethers can be provided which are joined integral to or otherwise secured directly to the elongate portion 441 of the hinge 306 or 307, that is without flange 442, and be within the scope of the present invention. Other arrangements for suspending mirror 220 with flexural members, such as tethers, that provide for a nonlinear restoring torque with or without the presence of torsional hinges, including with tethers that are not necessarily deployed perpendicularly to the mirror's longitudinal axis, are within the scope of this invention. For example, one or more tether-like members can be provided for pivotally securing mirror 220 to frame 346 and for providing a nonlinear restoring torque to the mirror. In one embodiment of such a configuration, four of such flexural or tether members can be provided, the tethers being symmetrically disposed relative to axis 303 and each such tether extending at a 45° or other oblique angle relative to axis 303.

The following equations were derived to better understand the relationship between the actuation voltage of first and second drive electrodes 322 and 323 as function of the deflection angle of mirror 220 about longitudinal axis 303 so as to provide a mirror assembly 200 having a suspension with a nonlinear force component. The relationship between the rotation angle θ of suspension 429 and the applied torque T, at the extreme side of mirror 220 was assumed to take on the following form:

$$T_s = k_1 \theta + k_3 \theta^3 \qquad (1)$$

where $k_1$ is the linear rotational spring constant for the suspension 42) and $k_3$ is the cubic spring constant for the suspension 429. θ is given in units of radians where, for example, 2 degrees equals approximately 0.035 radians. In establishing an angular deflection of mirror 220, $T_s$ is in equilibrium with the electrostatic torque $T_e$ generated by applying a voltage V to either one of drive electrodes 322 and 323. Assuming that mirror 220 is relatively rigid, the angular deflection of the mirror is equivalent to θ in equation (1). The electrostatic torque is represented by the equation:

$$T_e = \frac{V^2}{2} \frac{\partial C}{\partial \theta} \qquad (2)$$

where C is the capacitance between mirror 220 and drive electrodes 322 and 323. The capacitance for such a structure is typically a nonlinear function of the initial air gap g between the electrodes, the drive electrode width b/2, the drive electrode length a, the deflection angle, the specific geometry of mirror 220, and the permittivity of free space $\epsilon_0$. When the geometry of mirror 220 is relatively complex, finite element methods may be used to determine the capacitance as a function of deflection angle for any given geometry of the mirror. However, for the simple case of a flat rectangular mirror plate platform 341 having a length equal to that of the drive electrodes 322 and 323 and a half-width equal to the width of the drive electrodes, a closed form relationship for the capacitance is obtainable. For such a device that is assumed to undergo only rotational movement, that is no translation of the mirror plate 220 as the result of the applied voltage from electrodes 322 and 323, the capacitance is represents by the equation:

$$C = -\frac{\varepsilon_0 a}{\theta} \ln\left(1 - \frac{b\theta}{2g}\right). \qquad (3)$$

The capacitance for mirror 220 has been analyzed through finite element methods to be capable of being curve-fit to the equation:

$$C = -A\frac{\varepsilon_0 a}{\theta} \ln\left(1 - B\frac{b\theta}{2g}\right). \qquad (4)$$

where A and B are fitting parameters that are dependent on the specific rib 411 and mirror platform 341 geometry for a given design of the mirror 220. For a standard cross-ribbed mirror of the type shown in FIG. 10 of copending U.S. patent application Ser. No. 09/192,006 filed Nov. 13, 1998 [File No. A-66166-1] and described therein, A and B were found to be equal to 0.8525 and 1.311, respectively.

In determining the relationship between the actuation voltage V and the angular deflection θ of mirror 220, equations (3) and (4) can be used to evaluate the electrostatic torque $T_e$ of equation (2). The relationship $T_e=2T_s$, where the factor 2 accounts for the presence of a suspension 429 at each end of mirror platform 341, can then be used to relate equation (2) to equation (1). Solving for the actuation voltage V, the following equation is derived:

$$V = \sqrt{\frac{4\theta^3(k_1 + k_3\theta^2)}{\varepsilon_0 aA \left[\ln\left(1 - B\frac{b\theta}{2g}\right) + \frac{B\frac{b\theta}{2g}}{1 - B\frac{b\theta}{2g}}\right]}} \quad (5)$$

With respect to equation (5), the design issue for the suspension 429 provided by each torsional hinge 306 and 307 and respective tether 431 and 432 is to et the relative magnitudes of $k_1$ and $k_3$ to provide the most useful functional relationship between angular deflection and actuation voltage. Another design constraint for mirror 220 is its resonant frequency $f_{res}$ represented by the equation:

$$f_{res} = \frac{1}{2\pi}\sqrt{\frac{k}{I_m}} \quad (6)$$

where k is the effective spring constant for the torsional mode and $I_m$ is the mass moment of inertia of the mirror 220. Due to the inherent nonlinearity of suspension 429, this resonant frequency will be a function of the deflection angle θ. However, for the servo loop control employed for the mirror angular position, it is sufficient to design the resonant frequency assuming that $k=2k_2$ where, again, the factor of 2 accounts for the presence of two suspensions 429, one each at either end of mirror platform 341. Finite element analysis for the polysilicon cross-ribbed mirror has determined that $I_m=5.36E-13$ kg mm$^2$. For a torsional resonance design value of 30-kHz, $k_1$ is then determined to be 0.0095 mN mm (milinewton millimeter).

Figure 11:
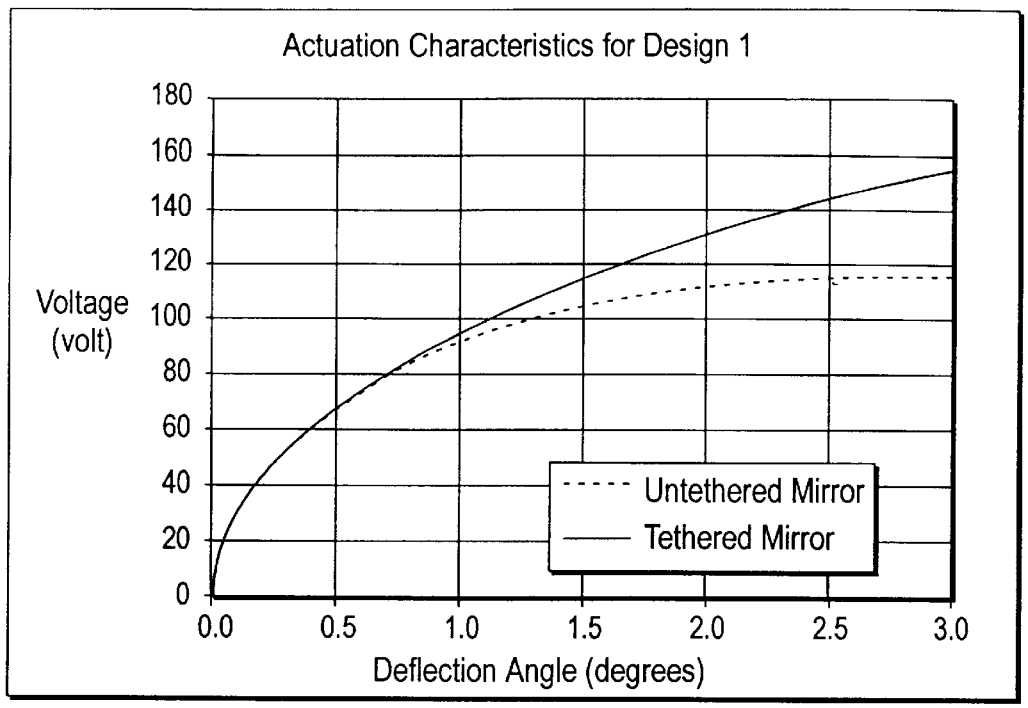
FIG. 11 is an analytically-derived graph of actuation voltage versus deflection angle for one embodiment of the micromachined mirror assembly of present invention compared to an untethered micromachined mirror assembly.

If it is assumed that pull-in for mirror 220 occurs at a deflection angle of approximately 1.5 degrees, one approach for the design of the suspension 429 formed by hinges 306 and 307 and tethers 431 and 432 is to ensure that the cubic term of equation (1) becomes significant at a deflection angle of 1.5 degrees so as to prevent pull-in. Taking the cubic term to be 20% of the linear term at this angle dictates that $k_3$ ought to be on the order of 290 times $k_1$. Given the value for $k_1$ derived in the preceding paragraph, $k_3$ is then calculated to be 2.77 mN mm. In this design, referred to as Design 1 herein, the initial gap between the drive electrodes 322 and 323 and the lower surface of platform 341 is assumed to be approximately 10 microns. Equation (5) has been evaluated for the cross-ribbed mirror 220 having the values of $k_1$ and $k_3$ referred to above, a=200 μm and b=140 μm, the resulting relationship being plotted in FIG. 11. Plotted on the same axes in FIG. 11 is the same relationship but with $k_3=0$, which represents the performance of the suspension 429 without tethers 431 and 432. As can be seen from FIG. 11, pull-in becomes a problem as the slope of the curve where $k_3=0$ tends towards zero. It is apparent from FIG. 11 that the tethered suspension 429 gives better immunity from pull-in out to a deflection angle of at least 2 degrees.

Figure 12:
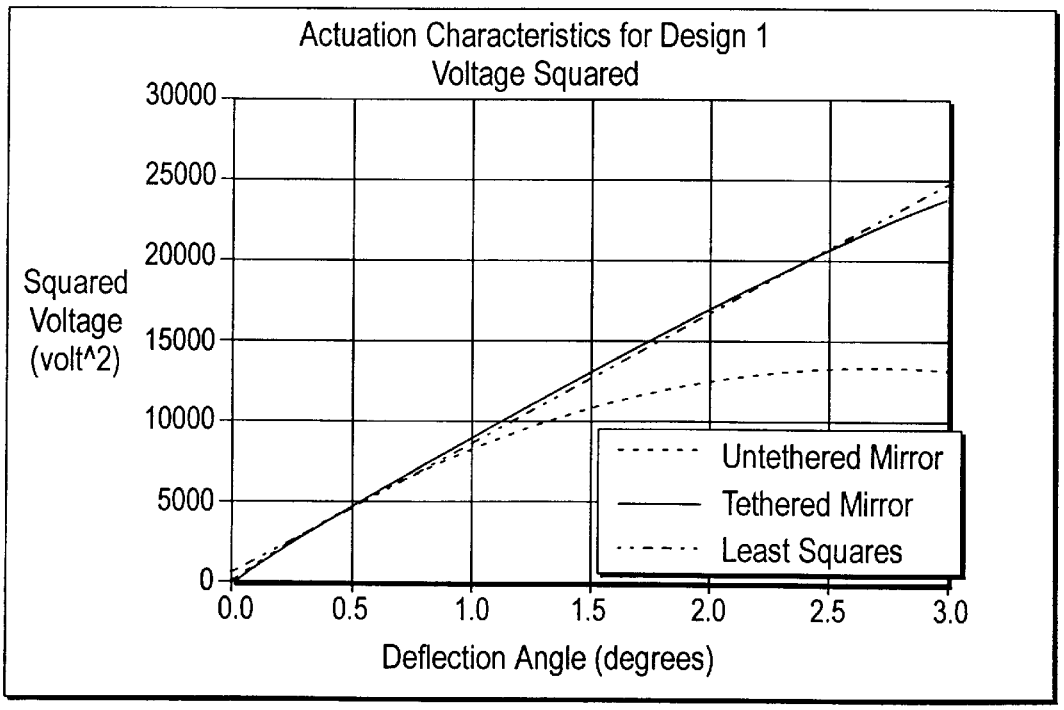
FIG. 12 is an analytically-derived graph of the square of the actuation voltage data of FIG. 11, for both a tethered and untethered micromachined mirror assembly versus deflection angle.

Design 1 gives a nearly quadratic relationship between angular deflection and actuation voltage. This is a useful approach given that a servo loop control in an optical data storage system can use a quadratic relationship to update the angular position of the mirror to correct for off-track positional error during track following. In FIG. 12, the same voltage data of FIG. 11 is squared and plotted versus the deflection angle θ. Note that the untethered mirror shows significant departure from linearity starting at about 1 degree of deflection, whereas the tethered mirror remains fairly linear as is evidenced from comparison of it to its least squares regression line.

Figures 13, 15:
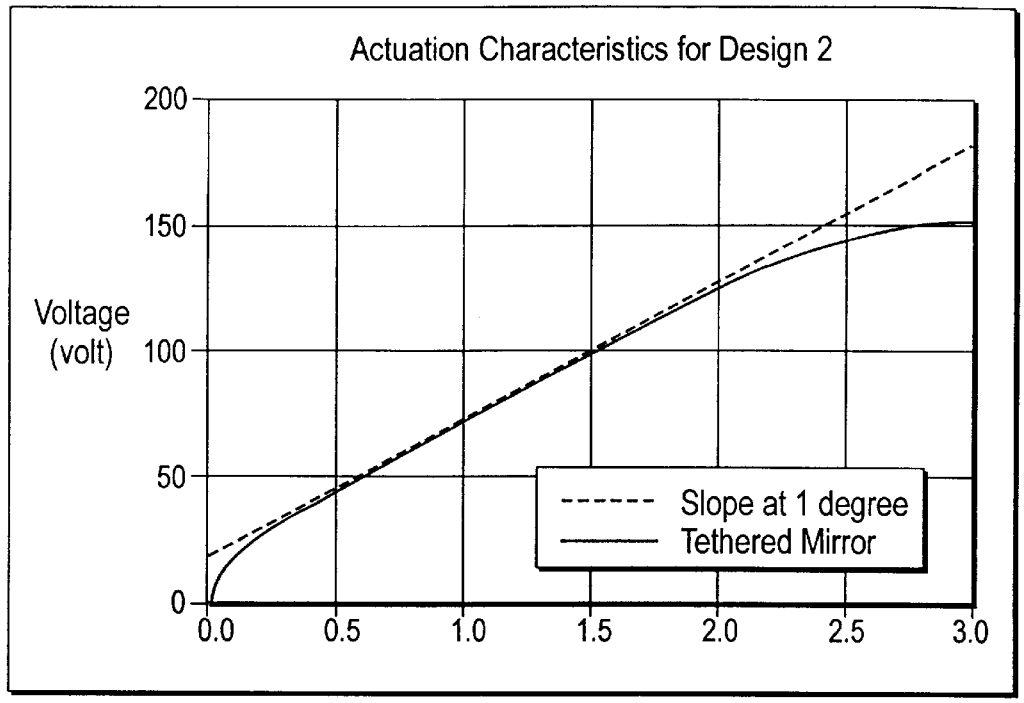
FIG. 13 is an analytically-derived graph of actuation voltage versus deflection angle for another embodiment of the micromachined mirror assembly of present invention.
FIG. 15 is a table setting forth analytically-derived dimension of the linear and nonlinear suspension members for the embodiments of the micromachined or assemblies analyzed in FIGS. 11 and 13.

In another design, referred to herein as Design 2, the relationship between the actuation voltage V and the angular deflection θ is made to be as linear as possible. For this design, we make the assumption that the mirror resonant frequency can be reduced somewhat without adversely affecting the servo loop control for the mirror position. Design 2 is further attractive in that the initial gap between the lower surface of mirror platform 341 and the first and second drive electrodes 322 and 323 is reduced below 10 μm. This design consideration serves to lower the necessary actuation voltage V for the pivoting of mirror 220 about longitudinal axis 303. Allowing for a somewhat lower resonant frequency allows $k_1$ to be reduced to, for example, 0.0080 mN mm. Setting $k_3$ to be 2500 times $k_1$, that is 20.0 mN mm and reducing the initial air gap to approximately 7 μm provides the approximate desired linear relationship out to at least 2 degrees of deflection as shown in FIG. 13. The dotted line in FIG. 13 represents the slope of equation (5) evaluated for one degree of deflection. For this calculation, the coefficients A and B of equation (5) are assumed to be the same as for the 10 μm initial gap case of Design 1.

Figure 14:
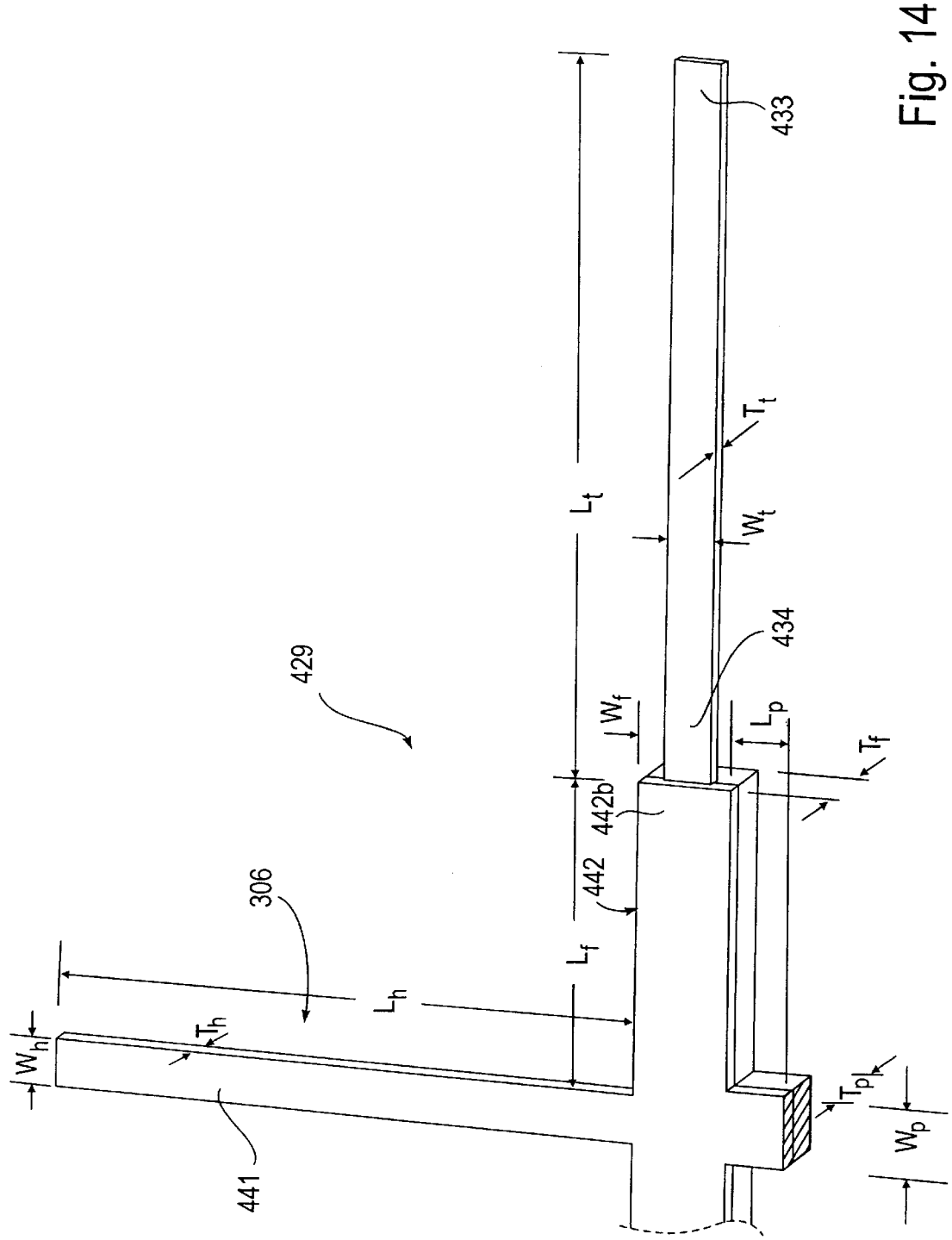
FIG. 14 is an enlarged view of a portion of the linear and nonlinear suspension members of the micromachined mirror assembly of FIG. 8.

To determine the geometry that gives the $k_1$ and $k_3$ values for Designs 1 and 2, nonlinear finite element analysis was performed using SDRC I-deas Master Series 6 software. The geometrical parameters that can be varied to give the desired values are shown in FIG. 14. The table of FIG. 15 gives the $k_1$ and $k_3$ results of this analysis and the required geometry for Designs 1 and 2. Dimensions are in microns, and the spring constants are in mN mm. A Young's modulus of 160 GPa and a Poisson's ratio of 0.3 were assumed, which are typical values for the polysilicon plate layer 342 used to construct the suspensions. FIG. 15 shows that the geometries listed are within reasonable agreement with the design goals specified in the previous discussion.

Figure 16:
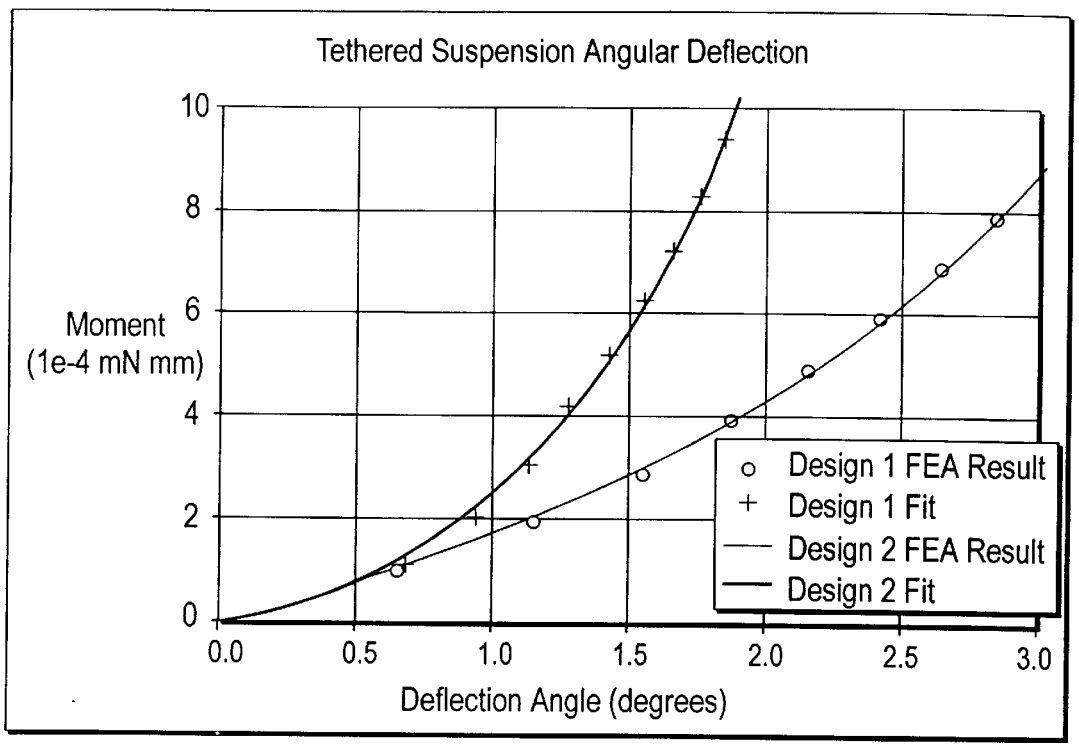
FIG. 16 is an analytically derived graph of the angular deflection of the linear and nonlinear suspension members for the embodiments of the micromachined mirror assemblies analyzed in FIGS. 11 and 13 as a function of the applied moments.
Figure 17:
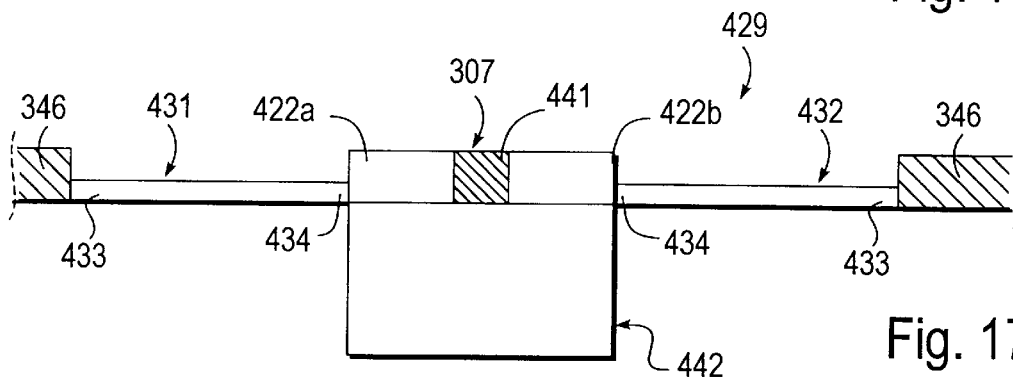
FIG. 17 is a cross-sectional view of a portion of the micro-machined mirror assembly of FIG. 8 taken along the line 17—17 of FIG. 9.

FIG. 16 shows plots of the angular deflection of the tethered suspension designs as a function of the applied electrostatic moments provided by first and second drive electrodes 322 and 323. Results from the nonlinear finite element analysis have been plotted along with the polynomial curve fits that include only linear and cubic terms having the $k_1$ and $k_3$ coefficients listed above. The fact that the curve fitting matches the finite element analysis results nearly exactly indicates that the supposition that the tethers behave as equation (1) is, in fact, correct.

The method for manufacturing mirror assembly 200 is described in detail in copending U.S. patent application Ser. No. 09/192,006 filed Nov. 13, 1998 [File No. A-66166-1]. As more fully described therein, elongate portions 441 of first and second torsional hinges 306 and 307 are formed from plate layer 342. First and second tethers 431 and 432 can also be formed from plate layer 342. The desired depth or thickness of tethers 431 and 432 can be obtained by thinning away the upper portion of the plate layer 342, by means of etching or otherwise, at the desired locations of the tethers. Alteratively, the plate layer 342 can be etched completely away at the locations of tethers 431 and 432 and an additional layer of any suitable material, such as the polysilicon material of plate layer 342, deposited, patterned and etched to form the tethers. Such an approach would likely enhance the control of the tether thickness. In yet a further alternative, tethers 431 and 432 could be constructed from an additional layer of silicon nitride or low stress silicon-rich silicon nitride that is appropriately deposited, patterned and etched to create the tethers. The portions of flanges 442 in the plane of plate layer 342 are formed in the same manner as elongate portions 441, while the portion of flanges 442 depending below the plate layer 342 can be formed in the same manner as ribs 411. In embodiments of mirror assembly 200 such as Design 2 where the relatively small gap between ribs 411 and planar base 301 results in the ribs 411 undesirably contacting planar base 301, trenches (not shown) of appropriate depth and size can be etched or otherwise formed in the planar base to accommodate ribs 411 during movement of mirror 220 about longitudinal axis 303.

Each of the mirror assemblies 200 is attached to a flying head 100 by adhering slider attach area 200b of the mirror assembly to angled face 202 of slider body 444. As shown most clearly in FIG. 2, where the bottom surface of substrate 311 is visible, the mirror assembly 200 is aligned on slider body 444 such that mirror 220 reflects laser beams 191,192 between extremity 102b of optical fiber 102 and objective objects 446. In the embodiment illustrated, mirror 220 reflects the laser beams through an angle of approximately 90° relative to the axis defined by the propagation direction of the impinging beam. It is preferable that laser beams 191, 192 each contact mirror 220 at the center thereof. Each mirror assembly 200 can be tested before and/or after its attachment to a flying head 106. Contact pads 391–393 are electrically coupled to controller 112 by means of respective wires as shown in FIG. 2.

In operation and use of system 100, control voltages are applied by the outputs of servo controller 112 to one of first and second drive electrodes 322 and 323 to cause mirror 220 to pivot about hinges 306 and 307 in first or second opposite directions between its first and second deflected positions. The drive voltages are supplied to first and second electrodes 322 and 323 by means of first and second contact pads 391 and 392. Maximum drive voltages range from 100 to 200 volts, preferably from 120 to 150 volts and more preferably approximately 135 volts. The electrostatic force between the drive electrode 322 or 323 and the respective mirror half 220c or 220d, grounded by means of ground contact pad 393, cause the mirror 220 to pivot about rotational axis 303.

The mirror 220 pivots from its home position, in either direction about mirror axis 303, through a deflection angle ranging from 0 to 2.5° and preferably approximately 2° when traveling from its home position to its fully deflected position. The controller 112 provides drive signals to first and second drive electrodes 322 and 323 at the Nyquist rate of approximately 19 kHz. The mirror 220 has a resonant frequency ranging from 25 to 50 kHz and preferably ranging from 25 to 30 kHz. Mirror assembly 200 reflects laser beams 191,192 between the distal extremity 102b of optical fiber 102 and the storage surface 109 of disk 107 to permit the optical recording and/or reading of information on the data tracks 110 of the storage surface 109.

Figure 7:
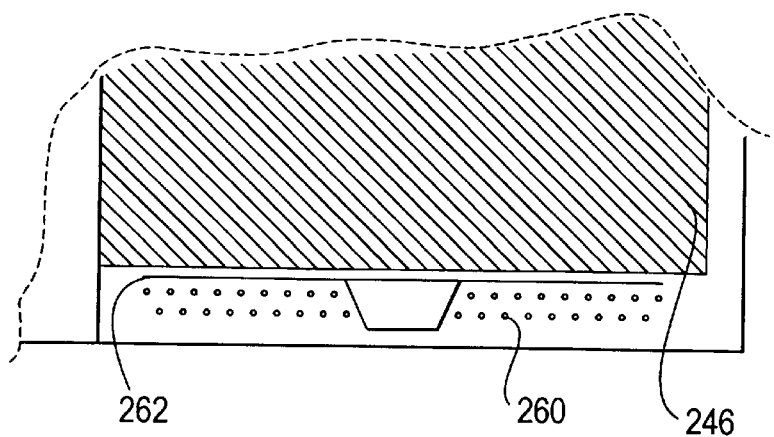
FIG. 7 is an enlarged cross-sectional view of the magneto-optical system slider head of FIG. 5 taken along the line 7–7 of FIG. 6.
Figure 18:
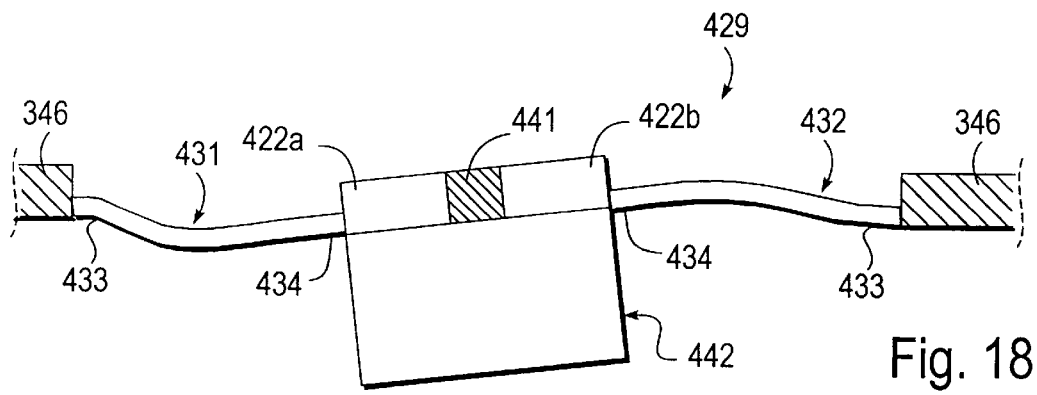
FIG. 18 is a cross-sectional view of the portion of the micromachined mirror assembly of FIG. 17 in a deflected position.

Mirror 220 is restrained during such rotation by the restoring torque of suspension 429. As discussed above, suspension 429 includes a linear component such as elongate portions 441 of first and second torsional hinges 306 and 307 and a nonlinear component that includes flanges 442 and first and second tethers 431 and 432. As shown in FIG. 7, tethers 431 and 432 and related flanges 442 are disposed in the plane of plate layer 342 when mirror 220 is in its undeflected position. When the mirror 220 is pivoted about axis 303, tethers 431 and 432 bend and elongate to restrain the mirror 220 from pivoting beyond a predetermined angle (see FIG. 18). The substantially rigid flanges 442 do not bend or stretch during movement of the mirror. However, the attachment of inner ends 434 of the tethers to first and second ends 442a and 442b of the flanges 442 enhance bending and stretching of tethers 431 and 432. More specifically, the moment arm resulting from the spacing of ends 442a and 442a at positions spaced apart from pivot axis 303 causes greater elevational movement and bending movement of the tethers 431 and 432 than if the tethers were secured directly to elongate portions 441 of the hinges 306 and 307.

The tethers 431 and 432 are designed such that for small angular deflections they provide a linear restoring torque that adds to but is smaller than the restoring torque provided by hinges 306 and 307. This linear restoring torque is provided by the bending of the tethers. As the angular deflection of mirror 220 is increased, the tethers are forced to stretch to accommodate the angular deflection. The stretching of the tethers is nonlinear, and more specifically a cubic function of the deflection angle of mirror, and can therefore be use to balance the nonlinear nature of the electrostatics of mirror assembly 200. In this manner suspension 429 with its nonlinear component permits the stable angular deflection range of mirror 220 to be increased by increasing the pull-in angle of the mirror. The attachment of tether 431 and 432 to torsional hinges 306 and 307 serves to inhibit undesirable bending of mirror 220 from the force of the tethers during pivotal movement of the mirror about longitudinal axis 303.

Fine tracking and short seeks to a series of nearby tracks 110 may be performed by rotating the mirror 220 about rotational axis 303 so that the propagation angle of the outgoing laser beam 191 is changed before transmission to the objective optics 246. Mirror 220 thus enables the focused optical spot 248 to be moved in the radial direction of the MO disk 107 for storage and/or retrieval of information, track following, and seeks from one data track 110 to another data track. Coarse tracking may be maintained by adjusting a current to the rotary actuator magnet and coil assembly 120 (see FIG. 4). The track following signals used to follow a particular track 110 of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks.

Irrespective of the movement of the set of actuator arms 105, a set of the mirror assemblies 200 of the present invention may be used to operate independently and thus permit track following and seeks so as to read and/or write information using more than one MO disk surface 109 at any given time. Independent track following and seeks using a set of concurrently operating mirror assemblies 200 preferably require a set of separate respective read channel and fine track electronics and mirror driving electronics. The small size and mass of the mirror assembly 200 contributes to the ability to design the flying head 106 with a low mass and a low profile.

The optical light emitter and receiver described herein can include a laser source carried by the read and/or write head in close proximity to the mirror assembly. In one such embodiment, the optical light emitter and receiver includes a laser source and one or more suitable polarization sensitive detectors. Such a system may or may not need a fiber optical element to transmit laser beams to or from the mirror assembly.

The mirror assemblies described above can be used in other than a flying magneto-optical head. For example, mirror assembly 220 can be utilized in any suitable optical recording and/or reading system. One application is in retrieving optical information from media using physical recording methods (e.g., CD-ROMs having data recorded as physical pits or depressions for reflecting and modulating the phase or intensity of a beam of incident light). The micromachined mirror assembly of the present invention may also have application in retrieving optical data from media having data storage locations providing optical phase modulation in the absence of magnetic fields. In addition, the micromachined mirror assemblies disclosed herein can be used outside of data recording and/or retrieval systems in applications that require a small deflectable mirror. For example, mirror assemblies 220 can be utilized in bar code scanning or optical switching in telecommunications or other areas. Mirror assemblies 220 with less than two drive electrodes or without drive electrodes, such as for use as sensors, are also contemplated hereby.

While the foregoing detailed description has described embodiments of the micromachined mirror assembly in accordance with this invention, it is to be understood that the above description is illustrative only and not limiting of the disclosed invention. It will be appreciated that it would be possible to modify the size, shape and appearance and methods of manufacture of various elements of the invention or to include or exclude various elements within the scope and spirit of this invention. In this regard, it should be appreciate that the utilization of any suspension for mirror 220 that includes a restoring torque component that is a nonlinear function of the deflection angle of the mirror, whether such component is coupled to one or more torsional hinges, the mirror itself or any combination thereof, is within the scope of the present invention.

From the foregoing, it can be seen that an improved micromachined mirror assembly having a restoring torque that increases nonlinearly with the deflection angle of the mirror to substantially compensate for the nonlinear electrostatic drive forces of the mirror assembly has been provided. Such a mirror assembly increases the pull-in angle so as to increase the useful deflection range of the mirror. In one embodiment, the mirror assembly is provided with one or more tethers coupled to the torsional hinges secured to the mirror. The tethers stretch during pivotal movement of the mirror to provide a nonlinear restoring torque to the mirror. The torsional hinges are preferably provided with substantially rigid flanges to which the tethers are joined. The flanges serve to enhance stretching of the tethers.

What is claimed is:

1. A mirror assembly of micron dimensions for use in deflecting a beam of light comprising a planar base, a planar mirror spaced apart from the planar base and disposed generally parallel to the planar base, the planar mirror having first and second end portions and a longitudinal axis extending between the first and second end portions, first and second torsional members extending along the longitudinal axis and connected to the respective first and second end portions for permitting the mirror to rock between first and second positions about the longitudinal axis relative to the planar base, means for securing the first and second torsional members to the planar base, at least a portion of the mirror being of a conductive material, first and second spaced-apart electrodes carried by the planar base for driving the mirror between the first and second positions, a tether member extending transversely of the longitudinal axis and being secured to the first torsional member and means for securing the tether member to the planar base whereby the tether member regulates the rocking of the mirror.

2. The mirror assembly of claim 1 wherein the means for securing the first and second torsional members to the planar base and the means for securing the tether member to the planar base includes a frame member extending around the mirror, the first and second torsional members and the tether member being secured to the frame member and the frame member being spaced apart from and secured to the planar base.

3. The mirror assembly of claim 1 wherein the tether member has a length and at least a portion of the tether member is elastic along the length and wherein the first torsional member includes an elongate portion extending along the longitudinal axis and a substantially rigid flange portion extending transversely of the elongate portion and having an end spaced outwardly from the elongate portion, the tether member being secured to the end of the flange portion whereby the flange portion enhances stretching of the tether member during rocking of the mirror between the first and second positions.

4. A mirror assembly of micron dimensions for use in deflecting a beam of light comprising a planar base, a planar mirror spaced apart from the planar base and disposed generally parallel to the planar base, the planar mirror having first and second end portions and a longitudinal axis extending between the first and second end portions, first and second torsional members extending along the longitudinal axis and connected to the respective first and second end portions for permitting the mirror to rock between first and second positions about the longitudinal axis relative to the planar base, means for securing the first and second torsional members to the planar base, at least a portion of the mirror being of a conductive material, first and second spaced-apart electrodes carried by the planar base for driving the mirror between the first and second positions, first and second tether members extending transversely of the longitudinal axis and being secured to at least one of the first and second torsional members and means for securing the first and second tether members to the planar base whereby the first and second tether members regulate the rocking of the mirror.

5. The mirror assembly of claim 4 wherein each of the first and second tether members has a length and wherein at least a portion of each of the first and second tether members is elastic along the length.

6. The mirror assembly of claim 4 wherein the at least one of the first and second torsional members includes an elongate portion extending along the longitudinal axis and a substantially rigid flange portion extending transversely of the elongate portion and having a first end spaced outwardly from the elongate portion, the first tether member being secured to the first end of the flange portion whereby the flange portion enhances stretching of the first tether member during rocking of the mirror between the first and second positions.

7. The mirror assembly of claim 6 wherein the flange portion has a second end spaced outwardly from the elongate portion opposite of the first end, the second tether member being secured to the second end of the flange portion.

8. The mirror assembly of claim 6 wherein the flange portion extends perpendicularly of the elongate portion.

9. The mirror assembly of claim 4 wherein the at least one of the first and second torsional members includes an elongate portion extending along the longitudinal axis and a substantially rigid flange portion extending perpendicularly of the elongate portion and having first and second opposite ends spaced outwardly from the elongate portion, the first tether member being secured to the first end of the flange portion and the second tether member being secured to the second end of the flange portion whereby the flange portion enhances stretching of the first and second tether members during rocking of the mirror between the first and second positions.

10. The mirror assembly of claim 4 wherein the first and second tether members are secured to the first torsional member.

11. The mirror assembly of claim 10 wherein the first and second tether members extend along an axis extending transversely of the longitudinal axis.

12. The mirror assembly of claim 11 wherein the first and second tether members extend along an axis extending perpendicularly of the longitudinal axis.

13. The mirror assembly of claim 10 further comprising an additional set of first and second tether members, the additional set of first and second tether members being secured to the second torsional member.

14. A mirror assembly of micron dimensions for use in deflecting a beam of light comprising a planar base, a planar mirror spaced apart from the planar base and disposed generally parallel to the planar base, the planar mirror having first and second end portions and a longitudinal axis extending between the first and second end portions, at least a portion of the mirror being of a conductive material, at least one stretchable member extending transversely of the longitudinal axis and being secured to the mirror and means for securing the stretchable member to the planar base whereby the mirror is rockable between first and second positions about the longitudinal axis and the stretchable member provides a nonlinear restoring force to the mirror during rocking of the mirror.

15. The mirror assembly of claim 14 further comprising a least one electrode carried by the planar base for rocking the mirror about the longitudinal axis.

16. The mirror assembly of claim 14 further comprising first and second torsional members extending along the longitudinal axis and connected to the respective first and second end portions and means for securing the first and second torsional members to the planar base.

17. The mirror assembly of claim 16 wherein the stretchable member is secured to the mirror by means of one of the torsional members.

18. An optical data storage system comprising a support body, an optical disk rotatably mounted on the support body and having a planar storage surface, the storage surface having a plurality of concentrically disposed data tracks, an arm having proximal and distal extremities, the proximal extremity of the arm pivotably mounted on the support body so that the distal extremity of the arm can pivot between first and second positions relative to the storage surface, a flying optical head mounted on the distal extremity of the arm for aerodynamic suspension adjacent the storage surface during rotation of the disk on the support body, an optical light emitter and receiver emitting a laser beam carried by the arm and a mirror assembly of micron dimensions carried by the head for reflecting the laser beam between the optical light emitter and receiver and the storage surface of the disk to permit the optical recording and/or reading of information on the data tracks of the storage surface, the mirror assembly having a planar base and a planar mirror spaced apart from the planar base and disposed generally parallel to the planar base, the planar mirror having first and second end portions and a longitudinal axis extending between the first and second end portions, the mirror assembly including first and second torsional members extending along the longitudinal axis and connected to the first and second end portions and means for securing the first and second torsional members to the planar base whereby the mirror is rockable between first and second positions about the longitudinal axis relative to the planar base, at least a portion of the mirror being of a conductive material, the mirror assembly having first and second spaced-apart electrodes carried by the planar base for driving the mirror between the first and second positions, the mirror assembly being provided with first and second tether members extending transversely of the longitudinal axis and being secured to at least one of the first and second torsional members and means for securing the first and second tether members to the planar base whereby the first and second tether members regulate the rocking of the mirror.

19. The data storage system of claim 18 wherein the first torsional member includes an elongate portion extending along the longitudinal axis and a substantially rigid flange portion extending perpendicularly of the elongate portion and having first and second opposite ends spaced outwardly from the elongate portion, the first tether member being secured to the first end of the flange portion and the second tether member being secured to the second end of the flange portion whereby the flange portion enhances stretching of the first and second tether members during rocking of the mirror between the first and second positions.

20. The data storage system of claim 19 wherein the first and second tether members are secured to the first torsional member, further comprising an additional set of first and second tether members, the additional set of first and second tether members being secured to the second torsional member.

* * * * *